US012470920B2

(12) United States Patent
Hemantharaja

(10) Patent No.: US 12,470,920 B2
(45) Date of Patent: Nov. 11, 2025

(54) SYSTEMS AND METHODS FOR DATA SECURITY IN COLLABORATIVE MACHINE LEARNING OF AUTONOMOUS VEHICLES

(71) Applicant: Harman International Industries, Incorporated, Stamford, CT (US)

(72) Inventor: Sharath Yadav Doddamane Hemantharaja, Karnataka (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 318 days.

(21) Appl. No.: 18/005,651

(22) PCT Filed: Sep. 15, 2020

(86) PCT No.: PCT/US2020/050921
§ 371 (c)(1),
(2) Date: Jan. 16, 2023

(87) PCT Pub. No.: WO2022/019932
PCT Pub. Date: Jan. 27, 2022

(65) Prior Publication Data
US 2023/0292117 A1     Sep. 14, 2023

(30) Foreign Application Priority Data
Jul. 21, 2020   (IN) .............................. 202011031177

(51) Int. Cl.
*H04L 9/00*     (2022.01)
*H04L 9/40*     (2022.01)
(Continued)

(52) U.S. Cl.
CPC ....... *H04W 12/0433* (2021.01); *H04L 63/062* (2013.01)

(58) Field of Classification Search
CPC ....................... H04W 12/0433; H04L 63/062
(Continued)

(56) References Cited

U.S. PATENT DOCUMENTS 10,392,022 B1 *   8/2019   Rau .................. G06N 20/20
11,170,320 B2 *   11/2021  Garg ................. H04L 67/1095
(Continued)

FOREIGN PATENT DOCUMENTS

CN   104917617 A *   9/2015
CN   107499262 A *   12/2017   ........... B60R 16/023
(Continued)

OTHER PUBLICATIONS

Dimitrakopoulos, G. et al., "Intelligent Transportation Systems," IEEE Vehicular Technology Magazine. vol. 5, No. 1, Mar. 15, 2020, 8 pages.
(Continued)

*Primary Examiner* — Haresh N Patel
(74) *Attorney, Agent, or Firm* — McCoy Russell LLP

(57) ABSTRACT

Embodiments are disclosed for a group security scheme for an autonomous vehicle engaged in a collaborative machine learning approach. As an example, a method comprises: generating, in a vehicle, a digital signature based on a first key and a second key, both of the first key and the second key received from a group manager, and transmitting a message signed with the digital signature to a collaborator, the message including coefficients of a local machine learning model of the vehicle. In this way, an accuracy of the local machine learning model of the vehicle may be increased, while a privacy of the vehicle is increased.

15 Claims, 9 Drawing Sheets

(51) Int. Cl.
*H04W 12/0433* (2021.01)
*H04W 4/40* (2018.01)

(58) Field of Classification Search
USPC .......................................................... 380/270
See application file for complete search history.

(56) References Cited

U.S. PATENT DOCUMENTS

| | | | |
|---|---|---|---|
| 2017/0366349 A1* | 12/2017 | Lyubashevsky | H04L 9/3218 |
| 2018/0109623 A1* | 4/2018 | Zibuschka | H04W 12/065 |
| 2018/0174457 A1* | 6/2018 | Taylor | G06N 3/045 |
| 2019/0102670 A1* | 4/2019 | Ceulemans | G06F 21/6218 |
| 2020/0029210 A1 | 1/2020 | Rasales et al. | |
| 2020/0410404 A1* | 12/2020 | Imani | H04L 9/085 |
| 2021/0004012 A1* | 1/2021 | Marchetti-Bowick | G05D 1/0221 |
| 2021/0072341 A1* | 3/2021 | Bocca | H04B 17/318 |
| 2021/0266732 A1* | 8/2021 | Zhou | H04L 9/3073 |

FOREIGN PATENT DOCUMENTS

| | | | | |
|---|---|---|---|---|
| CN | 109561383 A | * | 4/2019 | |
| CN | 111051172 A | * | 4/2020 | G06T 7/001 |
| CN | 111409647 A | * | 7/2020 | B60W 40/105 |
| JP | 6593560 B1 | * | 10/2019 | F02B 77/08 |
| KR | 20200016886 A | * | 2/2020 | |

OTHER PUBLICATIONS

Grover, J. et al., "Machine Learning Approach for Multiple Misbehavior Detection in VANET," Proceedings of the ACC 2011: Advances in Computing and Communications, Jul. 24, 2011, Kochi, India, 10 pages.

Zhang, J. et al., "Data-Driven Intelligent Transportation Systems: A Survey," IEEE Transactions on Intelligent Transportation Systems, vol. 12, No. 4, Dec. 2011, 16 pages.

Liu, Y. et al., "Boosting Privately: Privacy-Preserving Federated Extreme Boosting for Mobile Crowdsensing," arXiv Cornell University Website, Available Online at https://arxiv.org/abs/1907.10218, Available as Early as Jul. 24, 2019, 12 pages.

Samarakoon, S. et al., "Distributed Federated Learning for Ultra-Reliable Low-Latency Vehicular Communications," IEEE Transactions on Communications, vol. 68, No. 2, Feb. 2020, 14 pages.

Fu, Y. et al., "Vehicular Blockchain-Based Collective Learning for Connected and Autonomous Vehicles," IEEE Wireless Communications, vol. 27, No. 2, Apr. 2020, 8 pages.

Li, T. et al., "Federated Learning: Challenges, Methods, and Future Directions," IEEE Signal Processing Magazine, vol. 37, No. 3, May 2020, 11 pages.

ISA European Patent Office, International Search Report and Written Opinion Issued in Application No. PCT/US2020/050921, Apr. 9, 2021, WIPO, 15 pages.

* cited by examiner

| Symbols | Meaning |
|---|---|
| GV | A group consisting of n vehicles |
| GM | Group manager of the group GV |
| CM | Collaborator who verifies the signature |
| gpk | Public key of GV |
| gmsk | Secret key of GM |
| $V_i$ | Vehicle |
| gsk | Vehicle secret key |
| $LM_i$ | Local model |
| GB | Global model |
| M | Message containing LM |
| $\sigma$ | Group signature generated from message M |
| RA | Revocation Authority |

FIG. 6

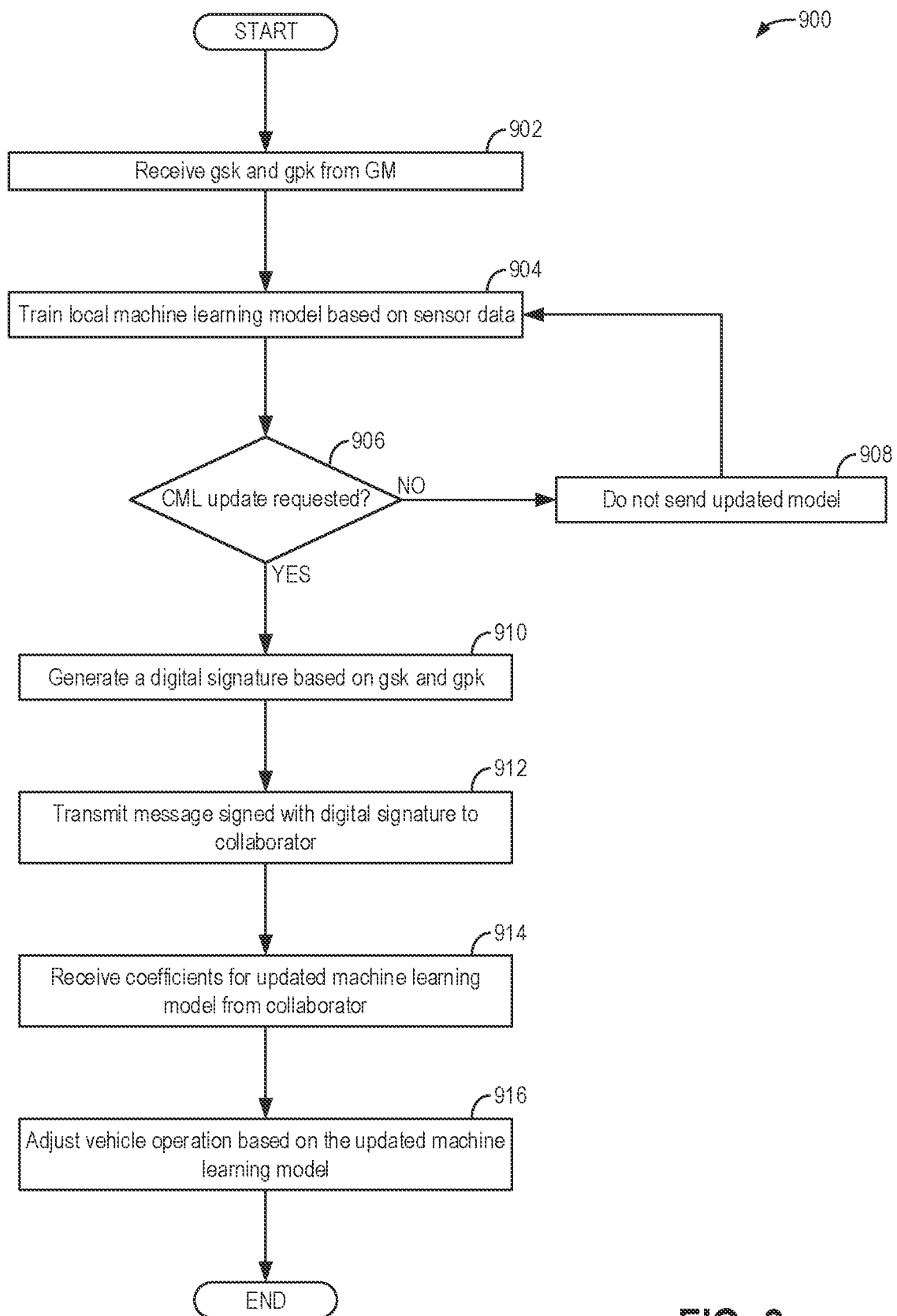

SYSTEMS AND METHODS FOR DATA SECURITY IN COLLABORATIVE MACHINE LEARNING OF AUTONOMOUS VEHICLES

CROSS-REFERENCE TO RELATED APPLICATIONS

The present application is a U.S. National Phase of International Application No. PCT/US2020/050921, entitled "SYSTEMS AND METHODS FOR DATA SECURITY IN AUTONOMOUS VEHICLES," and filed on Sep. 15, 2020. International Application No. PCT/US2020/050921 claims priority to Indian Patent application Ser. No. 20/201, 1031177, now abandoned, entitled "SYSTEMS AND METHODS FOR DATA SECURITY IN AUTONOMOUS VEHICLES", and filed on Jul. 21, 2020. The entire contents of the above-listed applications are hereby incorporated by reference for all purposes.

FIELD

The disclosure relates to the field of autonomous (e.g., self-driving) vehicles.

BACKGROUND & SUMMARY

Some motor vehicles may include systems for autonomous (e.g., self-driving) and/or partially autonomous operation. For example, a vehicle may be operated without user input (e.g., a fully autonomous vehicle), or with limited user input (e.g., a partially autonomous vehicle). For example, an autonomous driving system of the vehicle may at least partially control acceleration, braking, and steering systems of the vehicle in order to drive the vehicle. For example, a vehicle user may select a desired destination, and the autonomous driving system of the vehicle may autonomously control acceleration, braking, and steering in order to direct the vehicle to the desired destination. In some examples, the autonomous driving system includes at least one machine learning model for controlling the vehicle systems and monitoring an environment surrounding the vehicle. For example, a machine learning model of a vehicle may monitor data from a plurality of sensors in order to visualize and sense the surroundings, such as by detecting pedestrians and construction zones. As another example, the machine learning model of a vehicle may adjust braking and acceleration based on traffic patterns. The machine learning model of the vehicle may be pre-trained using training data from a variety of driving situations, and may be further trained in real-time during vehicle operation. Further, in order to increase accuracy of the machine learning model, some autonomous vehicles may collaborate with other autonomous vehicles, such as by sharing local data with a remote server, and receiving an updated machine learning model. Such a technique may be referred to as collaborative machine learning. Sharing vehicle data and machine learning models across a plurality of autonomous vehicles via collaborative machine learning may increase an intelligence of the machine learning models by transferring the learned knowledge from the local machine learning model of one vehicle to another across the distributed network.

However, in some examples, such sharing may lead to privacy concerns. As an example, transmitted vehicle data, which may include sensitive user information, may be accessed by unauthorized entities. As another example, an adversarial or unauthorized user may contribute counterproductive data, which may influence the machine learning training. For example, by providing faulty data, accuracy of the machine learning model provided to vehicles engaged in collaborative machine learning may be decreased. Further, such privacy concerns may present a barrier to adaptation of collaborative learning techniques. For example, a vehicle owner or user may be unwilling to engage in collaborative learning due to privacy concerns, which may decrease accuracy of their vehicle's local machine learning model.

The inventors have recognized the previously mentioned issues and have developed systems and methods to at least partially address the above issues. For example, a method comprises: generating, in a vehicle, a digital signature based on a first key and a second key, both of the first key and the second key received from a group manager, and transmitting a message signed with the digital signature to a collaborator, the message including coefficients and parameters of a local machine learning model of the vehicle.

In this way, an accuracy of an autonomous vehicle perception, path planning, and control system of a vehicle may be increased, while an incidence of privacy concerns is reduced. For example, by implementing a collaborative machine learning strategy, a plurality of vehicles may provide local machine learning models to a cloud server, which may construct an updated global machine learning model based on the local machine learning models from the plurality of vehicles. For example, because the updated global machine learning model incorporates data from the plurality of vehicles, the updated global machine learning model may be more accurate than each of the local machine learning models. The cloud server may distribute the updated global model to the plurality of vehicles, so that the group of vehicles may implement the updated global model. Further, by managing the group via a group signature scheme, each message (e.g., a message including a local machine learning model) may include a digital signature based on a group public key and a vehicle secret key, which may increase system security, increase system privacy, and allow unauthorized vehicles to be removed from the group of vehicles. Overall, system privacy and accuracy may be increased, which may in turn increase customer satisfaction with the autonomous vehicle perception, path planning, and control system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined distinctly by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIG. 6 shows a table including a plurality of symbols for components of a group signature scheme.

FIG. 9 shows a flowchart of a method for operating an autonomous vehicle with collaborative learning and a group signature scheme.

DETAILED DESCRIPTION

Figure 2:
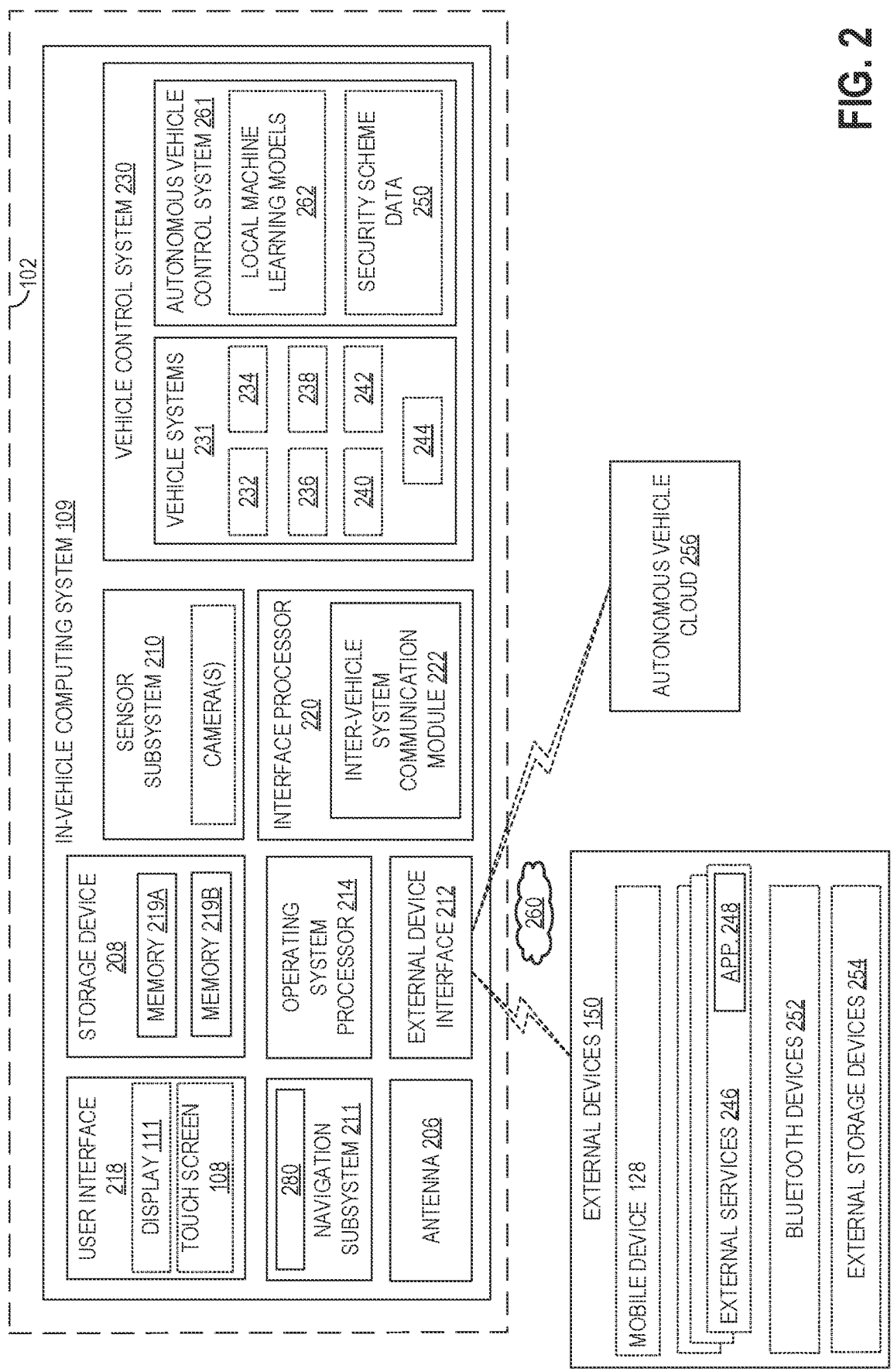
FIG. 2 shows a block diagram of an example in-vehicle computing system of a vehicle, in accordance with one or more embodiments of the present disclosure.
Figure 3:
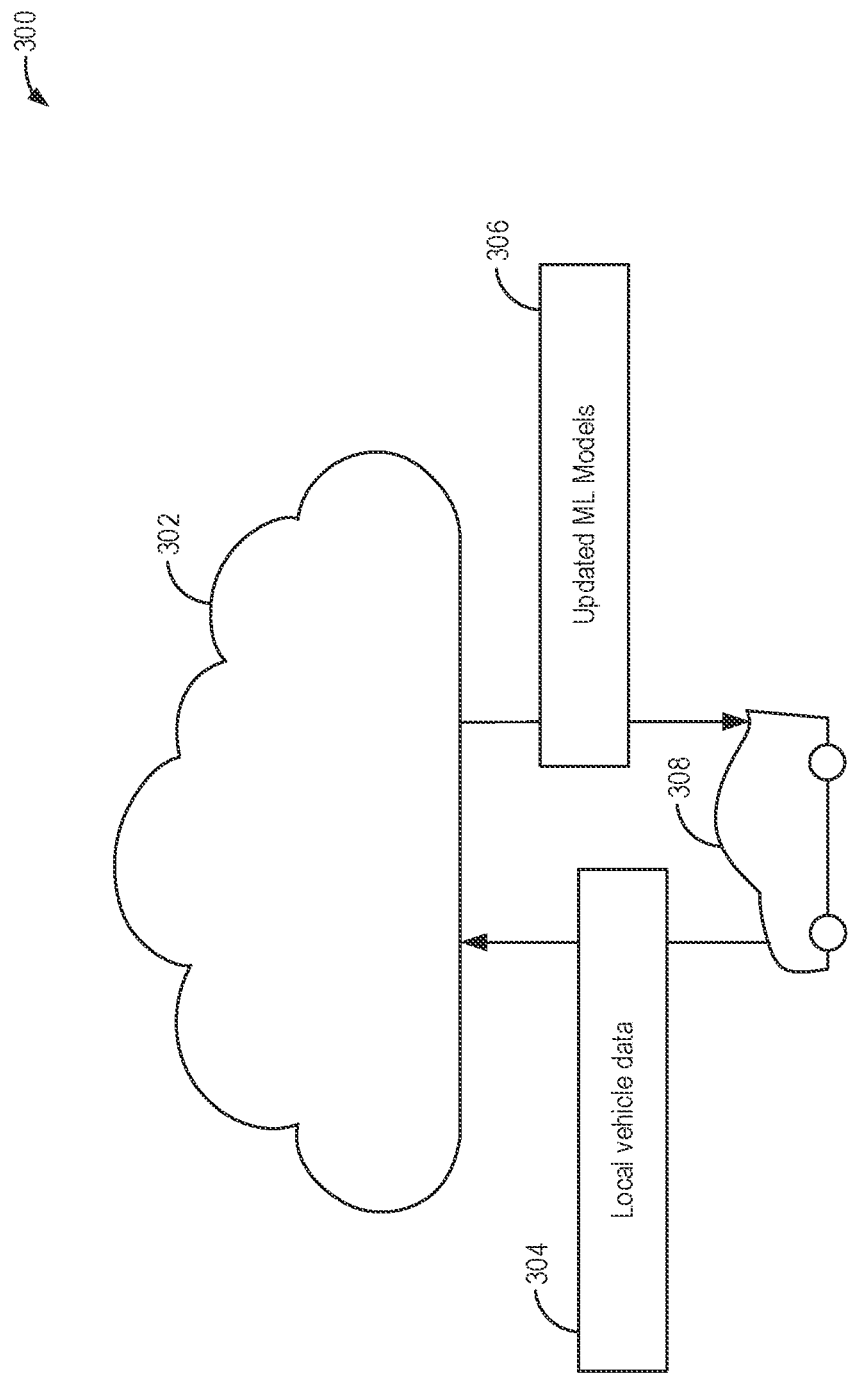
FIG. 3 shows an example autonomous vehicle system in communication with a remote server.
Figure 7:
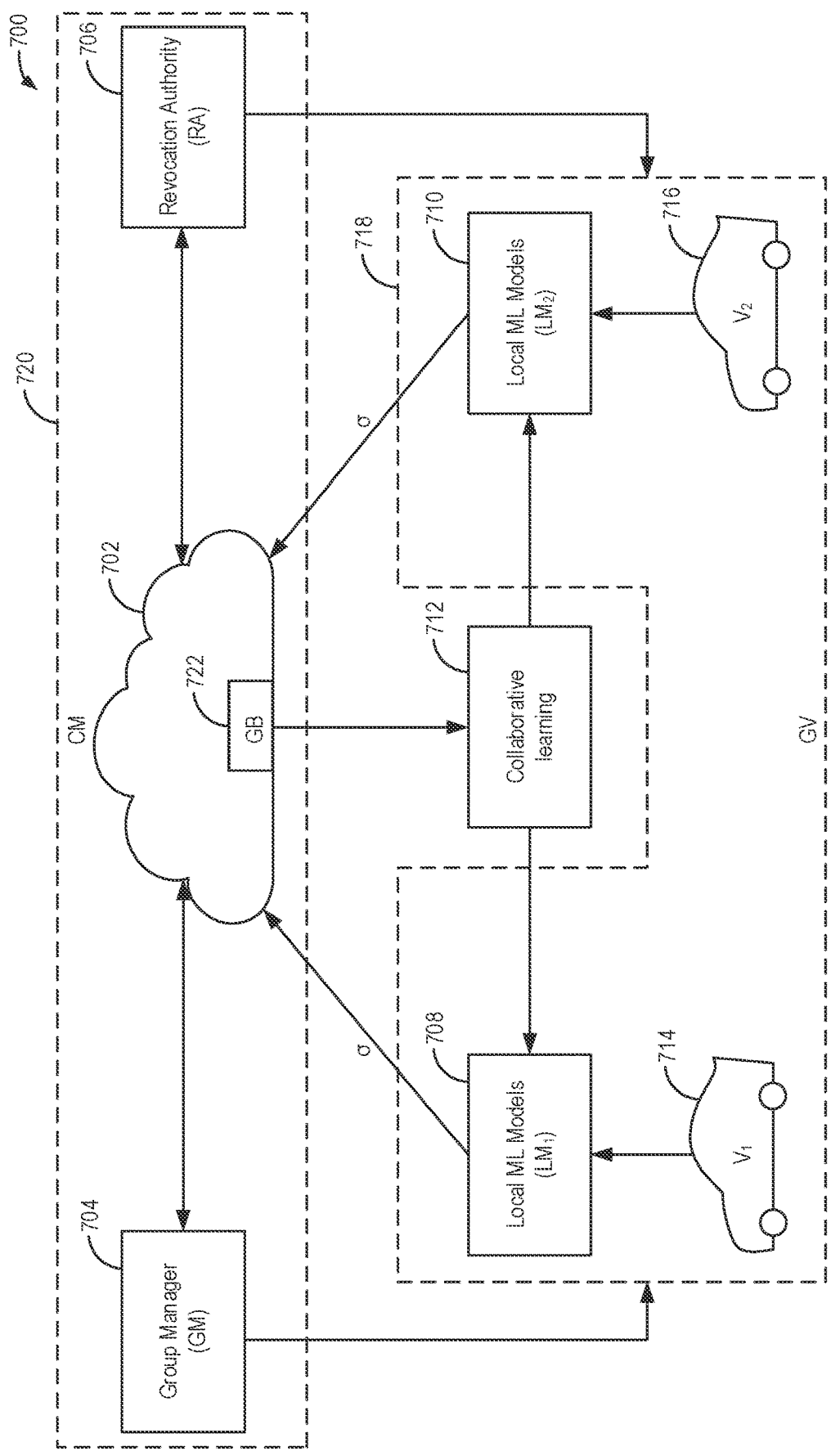
FIG. 7 shows an example system of autonomous vehicles using continuous machine learning and a group signature scheme.

As described above, autonomous vehicles may collaboratively share machine learning models in order to increase machine learning model accuracy, and may employ a group signature scheme in order to maintain data security. For example, a vehicle, such as the vehicle shown in FIG. 1, may include an autonomous mode for autonomously operating the vehicle. The autonomous mode may be operated via an autonomous vehicle perception, path planning, and control system, as shown in FIG. 2. In order to increase the accuracy of a machine learning model of an autonomous vehicle perception, path planning, and control system, a vehicle may provide local vehicle data to a remote server, and receive an updated machine learning model, as shown in FIG. 3. Further, in the example system shown in FIG. 4, a plurality of autonomous vehicles may engage in a collaborative machine learning network, in which the plurality of autonomous vehicles may upload local machine models to a remote server, and may receive updated models from the remote server. However, such a collaborative machine learning network may allow adversarial participants to adversely influence the system, as shown in FIG. 5. In order to reduce an incidence of privacy and/or security concerns, a group signature scheme may be provided, such as shown in FIGS. 6 and 7. For example, the group signature scheme may be applied to a group of vehicles using collaborative machine learning according to the method of FIG. 8. FIG. 9 shows a method for an individual vehicle participating in a collaborative machine learning approach with a group signature scheme.

Figure 1:
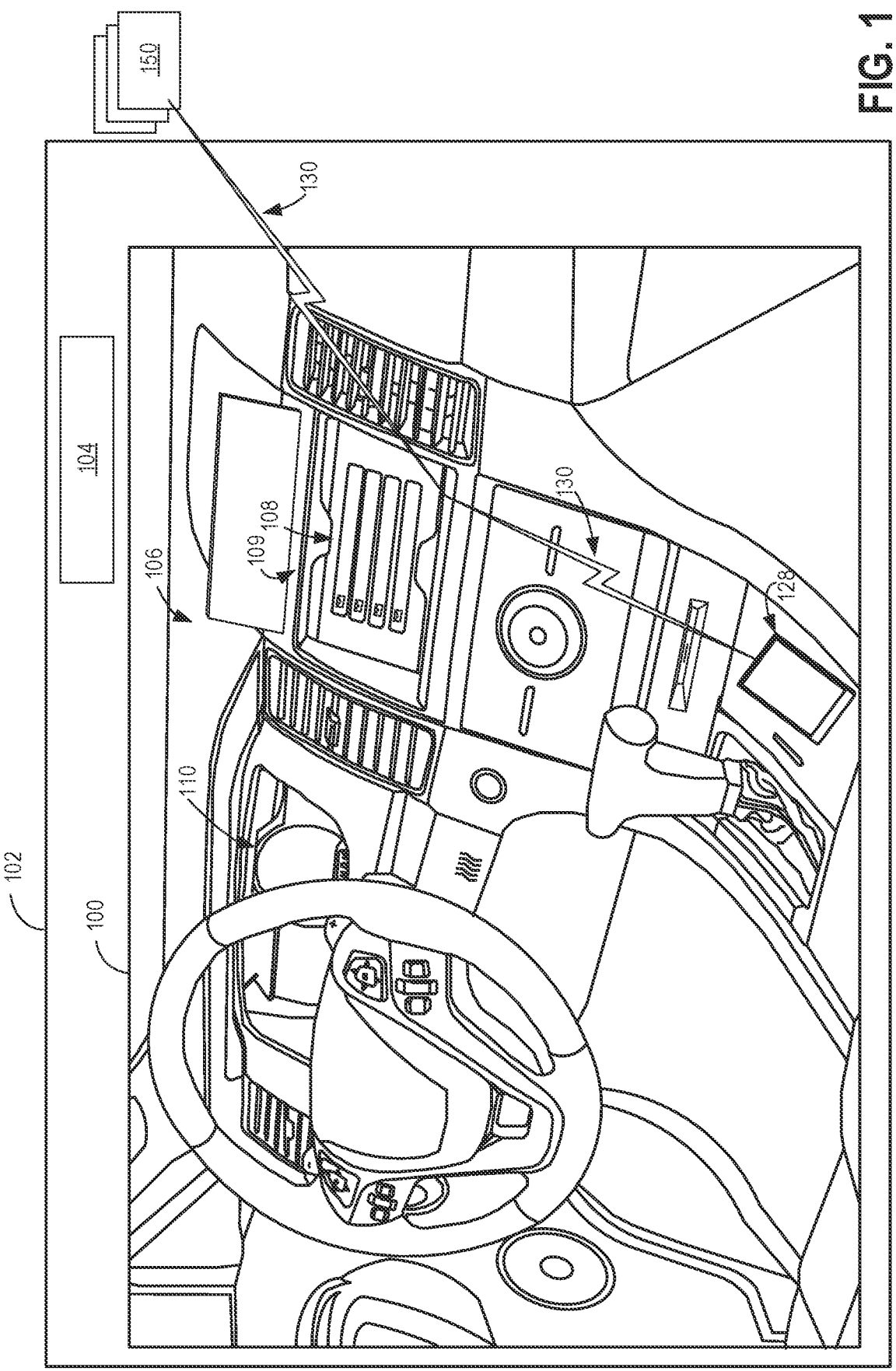
FIG. 1 shows an example partial view of a vehicle cabin in accordance with one or more embodiments of the present disclosure.

FIG. 1 shows an interior of a cabin 100 of a vehicle 102, in which a driver and/or one or more passengers may be seated. Vehicle 102 may be a road automobile, among other types of vehicles. In particular, vehicle 102 of FIG. 1 may be a motor vehicle including drive wheels (not shown) and an engine 104. In some examples, engine 104 may be an internal combustion engine. In other examples, engine 104 may be an electric engine, or may include hybrid components. For example, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

Further, vehicle 102 may be an autonomous vehicle. In some examples, vehicle 102 is a fully autonomous vehicle (e.g., fully self-driving vehicle) configured to drive without a user input. For example, vehicle 102 may independently control vehicle systems in order to direct the vehicle to a desired location, and may sense environmental features in order to direct the vehicle. In some examples, vehicle 102 is a partially autonomous vehicle. In some examples, vehicle 102 may have an autonomous mode, in which the vehicle operates without user input, and a non-autonomous mode, in which the user directs the vehicle. Further, in some examples, while an autonomous vehicle perception, path planning, and control system may primarily control the vehicle in an autonomous mode, a user may input commands to adjust vehicle operation, such as a command to change a vehicle speed, a command to brake, a command to turn, and the like.

For example, vehicle 102 may include a plurality of vehicle systems, including a braking system for providing braking, an engine system for providing motive power to wheels of the vehicle, a steering system for adjusting a direction of the vehicle, a transmission system for controlling a gear selection for the engine, an exhaust system for processing exhaust gases, and the like. Further, the vehicle 102 includes an in-vehicle computing system 109. The in-vehicle computing system 109 includes an autonomous vehicle perception, path planning, and control system for at least partially controlling vehicle systems during autonomous driving. As an example, while operating in an autonomous mode, the autonomous vehicle perception, path planning, and control system may monitor vehicle surroundings via a plurality of sensors (e.g., such as cameras, motion sensors, a GPS signal, and the like). Based on a desired destination and the vehicle surroundings, the autonomous vehicle perception, path planning, and control system may adjust the plurality of vehicle systems, such as by adjusting steering, braking, and speed to navigate the vehicle to a destination. The autonomous vehicle perception, path planning, and control system will be described in more detail with respect to FIG. 2 (e.g., autonomous vehicle perception, path planning, and control system 261 of FIG. 2).

As shown, an instrument panel 106 may include various displays and controls accessible to a human user (also referred to as the passenger) of vehicle 102. For example, instrument panel 106 may include a user input device such as a touch screen 108 of an in-vehicle computing system 109, an audio system control panel, and an instrument cluster 110. Touch screen 108 may receive user input to the in-vehicle computing system 109 for controlling audio output, visual display output, user preferences, control parameter selection, etc. In some examples, instrument panel 106 may include an input device for a user to transition the vehicle between an autonomous mode and a non-autonomous mode. For example, the vehicle includes an autonomous mode in which the autonomous vehicle perception, path planning, and control system operates the vehicle at least partially independently, and a non-autonomous mode, in which a vehicle user operates the vehicle. The vehicle user may transition between the two modes via the user input of instrument panel 106. Further, in some examples, instrument panel 106 may include one or more controls for the autonomous vehicle perception, path planning, and control system, such as for selecting a destination, setting desired vehicle speeds, setting navigation preferences (e.g., a preference for highway roads over city streets), and the like. Further, additional user interfaces, not shown, may be present in other portions of the vehicle, such as proximate to at least one passenger seat. For example, the vehicle may include a row of back seats with at least one touch screen controlling the in-vehicle computing system 109.

FIG. 2 shows a block diagram of an in-vehicle computing system 109 configured and/or integrated inside vehicle 102. In-vehicle computing system 109 may perform one or more of the methods described herein in some embodiments. The in-vehicle computing system may include, or be coupled to, various vehicle systems, sub-systems, hardware components, as well as software applications and systems that are integrated in, or integratable into, vehicle 102 in order to enhance an in-vehicle experience for a driver and/or a passenger. Further, the in-vehicle computing system may be coupled to systems for providing autonomous vehicle control. For example, the in-vehicle computing system includes an autonomous vehicle perception, path planning, and control system 261 for autonomously controlling the vehicle.

In-vehicle computing system 109 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle sub-systems 231 and autonomous vehicle perception, path planning, and control system 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine Controller Area Network [CAN] bus through which engine related information may be communicated, a climate control CAN bus through which climate control related information may be communicated, and a multimedia data network through which multimedia data is communicated between multimedia components in the vehicle). For example, vehicle data outputs may be output to autonomous vehicle perception, path planning, and control system 261, and autonomous vehicle perception, path planning, and control system 261 may adjust vehicle sub-systems 231 based on the vehicle data outputs. For example, the in-vehicle computing system 109 may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A storage device 208 may be included in in-vehicle computing system 109 to store data such as instructions executable by processors 214 and 220 in non-volatile form. The storage device 208 may store application data, including prerecorded sounds, to enable the in-vehicle computing system 109 to run an application for connecting to a cloud-based server and/or collecting information for transmission to the cloud-based server. The application may retrieve information gathered by vehicle systems/sensors, input devices (e.g., user interface 218), data stored in volatile 219A or non-volatile storage device (e.g., memory) 219B, devices in communication with the in-vehicle computing system (e.g., a mobile device connected via a BLUETOOTH® link), etc. In-vehicle computing system 109 may further include a volatile memory 219A. Volatile memory 219A may be random access memory (RAM). Non-transitory storage devices, such as non-volatile storage device 208 and/or non-volatile memory 219B, may store instructions and/or code that, when executed by a processor (e.g., operating system processor 214 and/or interface processor 220), controls the in-vehicle computing system 109 to perform one or more of the actions described in the disclosure.

One or more additional sensors may be included in a sensor subsystem 210 of the in-vehicle computing system 109. For example, the sensor subsystem 210 may include a plurality of cameras, such as a rear view camera for assisting a user in parking the vehicle and/or a cabin camera for identifying a user (e.g., using facial recognition and/or user gestures). The plurality of cameras may further include at least one camera for environmental sensing during autonomous operation, such as a camera for detecting upcoming road obstacles, a camera for detecting lane changes, and the like. Sensor subsystem 210 of in-vehicle computing system 109 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. For example, data from sensor subsystem 210 may be used by autonomous vehicle perception, path planning, and control system 261 in order to sense the vehicle environment and control vehicle systems. While certain vehicle system sensors may communicate with sensor subsystem 210 alone, other sensors may communicate with both sensor subsystem 210 and vehicle control system 230, or may communicate with sensor subsystem 210 indirectly via vehicle control system 230.

A navigation subsystem 211 of in-vehicle computing system 109 may generate and/or receive navigation information such as location information (e.g., via a GPS sensor and/or other sensors from sensor subsystem 210), route guidance, traffic information, point-of-interest (POI) identification, and/or provide other navigational services for the user. Navigation sub-system 211 may include inputs/outputs 280, including analog to digital converters, digital inputs, digital outputs, network outputs, radio frequency transmitting devices, etc. In some examples, navigation sub-system 211 may interface with vehicle control system 230, such as autonomous vehicle perception, path planning, and control system 261. For example, navigation sub-system 211 may output map data, traffic data, suggested routes, and the like to autonomous vehicle perception, path planning, and control system 261 to facilitate autonomous vehicle operation.

External device interface 212 of in-vehicle computing system 109 may be coupleable to and/or communicate with one or more external devices 150 located external to vehicle 102. While the external devices are illustrated as being located external to vehicle 102, it is to be understood that they may be temporarily housed in vehicle 102, such as when the user is operating the external devices while operating vehicle 102. In other words, the external devices 150 are not integral to vehicle 102. The external devices 150 may include a mobile device 128 (e.g., connected via a BLUETOOTH®, NFC, Wi-Fi® direct, or other wireless connection 130) or an alternate BLUETOOTH® enabled device 252. Mobile device 128 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 150 may communicate with in-vehicle computing system 109 either wirelessly or via connectors without departing from the scope of this disclosure. For example, external devices 150 may communicate with in-vehicle computing system 109 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the user. For example, the external device interface 212 may enable voice calls to be established and/or text messages (e.g., SMS, MMS, etc.) to be sent (e.g., via a cellular communications network) to a mobile device 128 associated with a contact of the user. Further, in some examples, a vehicle user may adjust autonomous vehicle operation via an application of the mobile device 128 associated with the user. The external device interface 212 may additionally or alternatively provide a wireless communication interface to enable the in-vehicle computing system to synchronize data with one or more devices in the vehicle (e.g., the user's mobile device) via Wi-Fi® direct.

One or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the user, vehicle, and environment and perform an action based on the context (e.g., requesting/sending data to other devices).

In-vehicle computing system 109 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via FR such as via antenna(s) 206 or via infrared or other means through appropriate receiving devices. For example, antenna 206 may receive voice calls (e.g., such as telephone calls). Additionally, antenna 206 may provide AM/FM radio signals to external devices 150 (such as to mobile device 128) via external device interface 212.

Vehicle control system 230 may include controls for controlling aspects of various vehicle sub-systems 231 involved in different vehicle functions. For example, a plurality of vehicle sub-systems 231 may be controlled in order to operate the vehicle. In some examples, vehicle sub-systems 231 may be controlled at least in part by a user input, while in some examples, vehicle sub-systems 231 may be at least partially controlled via the autonomous vehicle perception, path planning, and control system 261. FIG. 2 shows a plurality of vehicle sub-systems 231, including a braking system 232, an acceleration control system 234, a telecommunications control system 236, a steering control system 238, a climate control system 240, an exterior lighting control system 242, and an audio system 244. In some examples, additional vehicle systems may be included in vehicle sub-systems 231. Additional vehicle systems may include a cruise control system, an object detection system, a parking system, a lighting system, and the like.

Braking system 232 may be configured to control an amount of braking force applied to the vehicle. For example, during a non-autonomous mode of operation, braking system 232 may be controlled by a brake pedal. For example, the user may depress the brake pedal in order to increase an amount of braking applied to the vehicle. During an autonomous mode of operation, braking system 232 may be controlled by autonomous vehicle perception, path planning, and control system 261. For example, the autonomous vehicle perception, path planning, and control system 261 may determine that additional braking is requested, and may apply additional braking. In some examples, the autonomous vehicle perception, path planning, and control system may depress the brake pedal in order to apply braking (e.g., to decrease vehicle speed and/or bring the vehicle to a stop).

Acceleration control system 234 may be configured to control an amount of acceleration applied to the vehicle. For example, during a non-autonomous mode of operation, acceleration control system 234 may be controlled by an acceleration pedal. For example, the user may depress the acceleration pedal in order to increase an amount of torque applied to wheels of the vehicle, causing the vehicle to accelerate in speed. During an autonomous mode of operation, acceleration control system 234 may be controlled by autonomous vehicle perception, path planning, and control system 261. For example, the autonomous vehicle perception, path planning, and control system 261 may determine that additional vehicle speed is requested, and may increase vehicle speed via acceleration. In some examples, the autonomous vehicle perception, path planning, and control system 261 may depress the acceleration pedal in order to accelerate the vehicle.

Steering control system 238 may be configured to control a direction of the vehicle. For example, during a non-autonomous mode of operation, steering control system 238 may be controlled by a steering wheel. For example, the user may turn the steering wheel in order to adjust a vehicle direction. During an autonomous mode of operation, steering control system 238 may be controlled by the autonomous vehicle perception, path planning, and control system 261. For example, the steering control system 261 may determine that a change in vehicle direction is requested, and may change the vehicle direction via controlling the steering control system 238. For example, steering control system 238 may adjust axles of the vehicle in order to change the vehicle direction.

Climate control system 240 may be configured to provide a comfortable environment within the cabin or passenger compartment of vehicle 102. Climate control system 240 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet. In some examples components of climate control system 240 may be controlled by autonomous vehicle perception, path planning, and control system 261. However, a user may adjust climate control system 240 via user input devices such as touchscreen 108 and other buttons in the vehicle cabin. For example, although autonomous vehicle perception, path planning, and control system 261 may maintain a temperature in the vehicle cabin at a pre-determined temperature, a user may adjust the climate control system to adjust the temperature.

Vehicle control system 230 may also include controls for adjusting the settings of various vehicle controls (or vehicle system control elements) related to the engine and/or auxiliary elements within a cabin of the vehicle, such as steering wheel controls (e.g., steering wheel-mounted audio system controls, cruise controls, windshield wiper controls, headlight controls, turn signal controls, etc.), instrument panel controls, microphone(s), a gear shift, door/window controls positioned in a driver or passenger door, seat controls, cabin light controls, etc. Vehicle controls may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. Further, in order to autonomously control the vehicle, an object detection system may use sensor data, such as from a camera and motion sensor, to detect obstacles in the vehicle path and adjust vehicle operation based on the obstacles. The control signals may also control a vehicle audio system (not shown). For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 240. For example, the control signals may increase delivery of cooled air to a specific section of the cabin. For example, while operating in an autonomous mode, the autonomous vehicle perception, path planning, and control system 261 may control some or all of the above vehicle controls.

Control elements positioned on an outside of a vehicle (e.g., controls for a security system) may also be connected to computing system 109, such as via communication module 222. The control elements of the vehicle control system may be physically and permanently positioned on and/or in the vehicle for receiving user input. In addition to receiving control instructions from in-vehicle computing system 109, vehicle control system 230 may also receive input from one or more external devices 150 operated by the user, such as from mobile device 128. This allows aspects of vehicle sub-systems 231 and vehicle controls 261 to be controlled based on user input received from the external devices 150.

In order to control the vehicle sub-systems 231, autonomous vehicle perception, path planning, and control system 261 includes a plurality of local machine learning models 262. While operating in an autonomous mode, the autonomous vehicle perception, path planning, and control system 261 may combine a variety of data from various sources (e.g., from sensor subsystem 210, navigation subsystem 211, and the like) in order to visualize the environment and predict future events. For example, the autonomous vehicle perception, path planning, and control system 261 includes a perception system, which may monitor vehicle surrounding based on sensor data, a high level path planning system, a low level path planning, and vehicle controllers. The plurality of local machine learning models 262 may provide a model for controlling vehicle systems based on the variety of data. Further, the plurality of local machine learning models 262 may be trained during vehicle operation. For example, autonomous vehicle perception, path planning, and control system 261 may use machine learning in order to increase an accuracy of control methods for each of the vehicle sub-systems 231. For example, the local machine learning models 262 may be trained on vehicle data in order to increase an accuracy of the local machine learning models. The local machine learning models may be updated both while operating in an autonomous mode and a non-autonomous mode. Further, in order to simplify a learning process, a separate machine learning model may be developed for each vehicle system of vehicle sub-systems 231. For example, a first local machine learning model may be trained on data from braking system 232, while a second machine learning model may be trained on data from acceleration control system 234.

Further, external device interface 212 may provide a communication interface with an autonomous vehicle cloud 256. For example, autonomous vehicle perception, path planning, and control system 261 may exchange data with autonomous vehicle cloud 256 in order to increase an accuracy and reliability of autonomous operation. For example, the vehicle may be engaged in collaborative learning, such as by sending local data and/or local machine learning models to autonomous vehicle cloud 256, which may provide updated machine learning models based on data from a plurality of vehicles. In order to maintain security in such a system, vehicle 102 may include security scheme data 250 for authentication, as well be elaborated below with respect to FIGS. 6-8. For example, the autonomous vehicle cloud 256 may include a plurality of controllers, each controller including non-volatile memory for storing executable instructions. For example, as shown in FIG. 7, the autonomous vehicle cloud 256 may include a first controller acting as a group manager, a second controller acting as a collaborator, and a third controller acting as a revocation authority.

In previous machine learning approaches, vehicle data is shared with a cloud server, and the cloud server provides updated machine learning models for the vehicle, in order to increase an accuracy of the local machine learning mode. An example of a vehicle using such an approach is shown in FIG. 3. In particular, FIG. 3 shows a network 300 including a vehicle 308 providing local vehicle data 304 to a machine learning cloud 302. Vehicle 308 may be an autonomous vehicle (e.g., a fully autonomous vehicle or a partially autonomous vehicle) including a plurality of local machine learning models, each of the plurality of local machine learning models trained on vehicle data 304 in order to automatically operate vehicle 308. Vehicle 308 may periodically and/or continuously upload the vehicle data 304 to the machine learning cloud 302. For example, the machine learning cloud 302 may include global machine learning models, which may be trained based on vehicle data 304 from vehicle 308. The machine learning cloud 302 may provide updated local machine learning models 306 to vehicle 308 based on the updated global machine learning models, in order to increase an accuracy of operation of vehicle 308. This process may continue indefinitely. For example, the vehicle may continue to upload vehicle data to the machine learning cloud 302, the machine learning cloud 302 may continue to update global machine learning models based on data from the vehicle, and the machine learning cloud 302 may continue to transmit updated local machine learning models to vehicle 308. Thus, the local machine learning models for controlling vehicle 308 may be adjusted over time, leading to increased vehicle accuracy and increased customer satisfaction.

However, the machine learning system described in FIG. 3 may incorporate training data from a single vehicle. In order to further increase accuracy of an autonomous vehicle perception, path planning, and control system, a Collaborative Machine Learning (CML) approach may be applied to an autonomous vehicle (e.g., such as vehicle 102) in order to continuously update local machine learning models. With a CIVIL approach, a plurality of local machine learning models from a plurality of vehicles may be uploaded to a machine learning cloud. For example, the machine learning cloud may be autonomous vehicle cloud 256. Based on the plurality of local machine learning models, the machine learning cloud may construct a global machine learning model, which may be transmitted to each of the plurality of vehicles. For example, because the global machine learning model is based on the plurality of local machine learning models, it may incorporate more data and be more accurate. The machine learning cloud may transmit the global machine learning model to each of the plurality of vehicles. In some examples, each vehicle may have a plurality of local machine learning models, each of the plurality of local machine learning models specific to a vehicle system. For example, a vehicle may have a local machine learning model for a steering system and a local machine learning model for a braking system. Such a CML approach may be applied for each local machine learning model.

Figure 4:
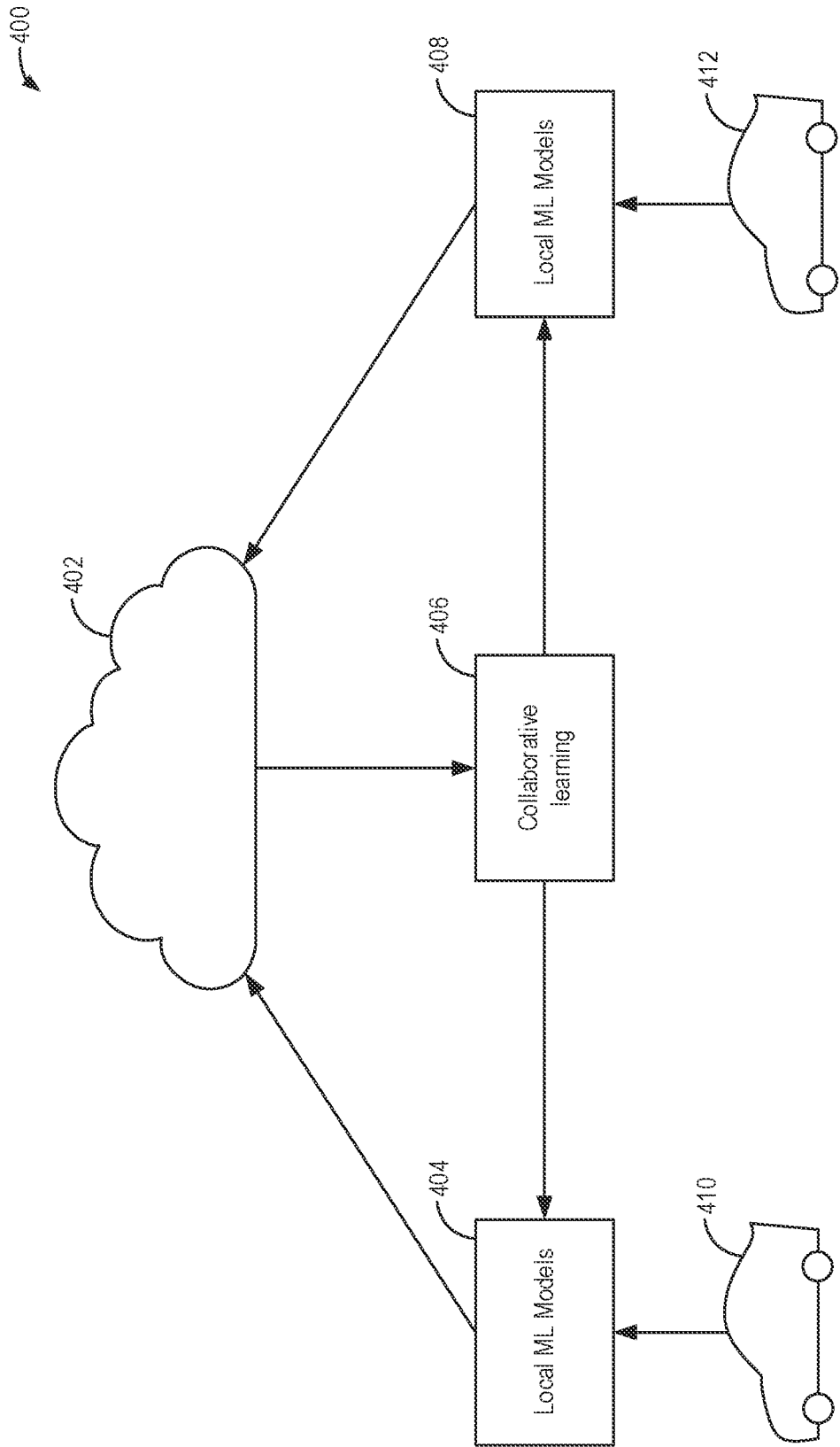
FIG. 4 shows an example system of autonomous vehicles using continuous machine learning.
Figure 5:
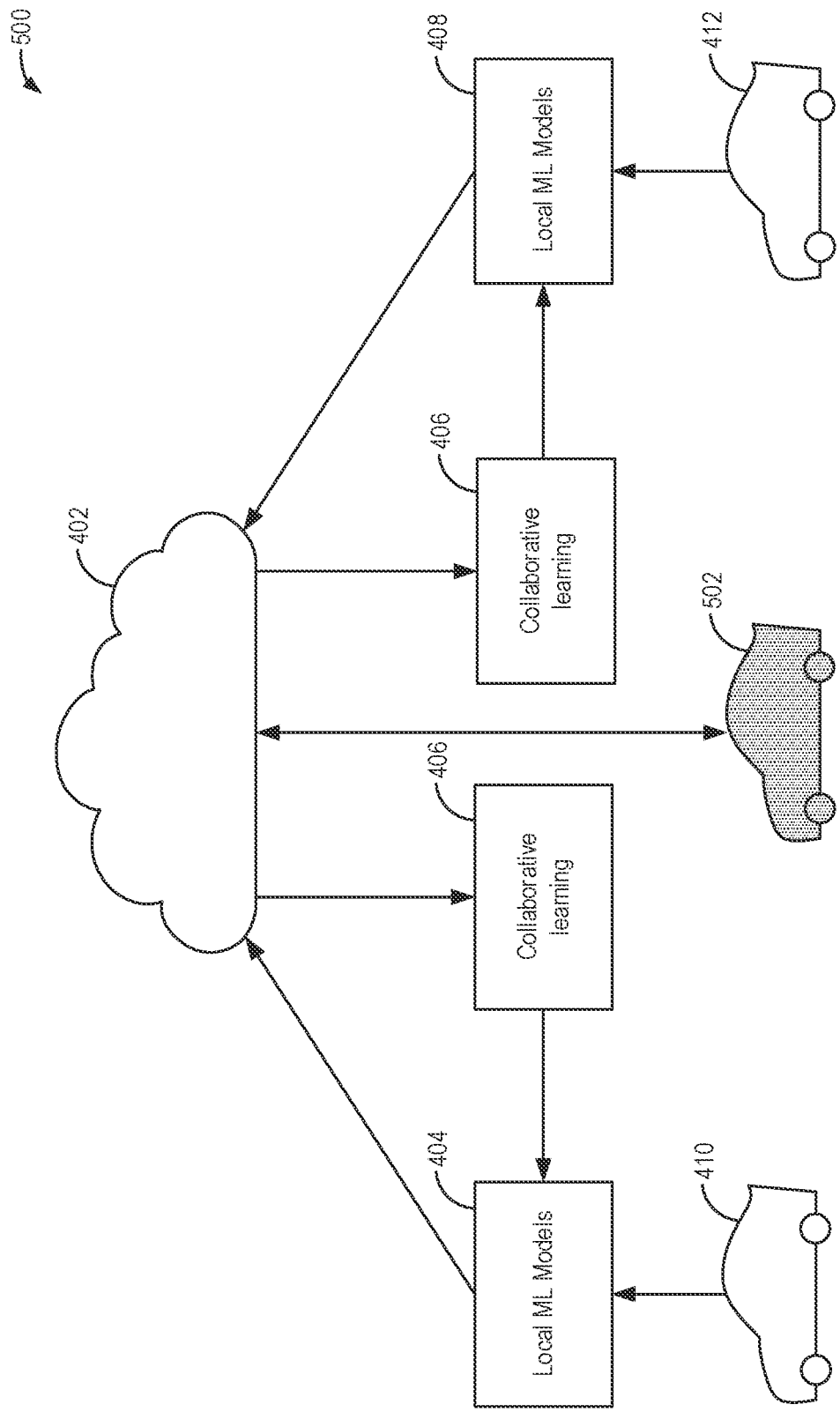
FIG. 5 shows an example system of autonomous vehicles using continuous machine learning including an adversarial participant.

FIG. 4 shows an example system 400 for applying the CIVIL approach to autonomous vehicles. In particular, FIG. 4 shows two vehicles, a first vehicle 410 and a second vehicle 412, engaged in the CIVIL approach. Each of the first vehicle 410 and the second vehicle 412 may be configured similarly to vehicle 102 of FIGS. 1 and 2. Specifically, each of the first vehicle 410 and the second vehicle 412 may be at least partially autonomous vehicles, and each of the first vehicle 410 and the second vehicle 412 may include an autonomous vehicle perception, path planning, and control system (e.g., autonomous vehicle perception, path planning, and control system 261) including at least one local machine learning model. For example, as elaborated with respect to FIG. 2, an autonomous vehicle perception, path planning, and control system may include a plurality of local machine learning models, each local machine learning model controlling a vehicle system. For example, a first local machine learning model may control a braking system, and a second local machine learning model may control an acceleration system. As shown, the first vehicle 410 may upload local machine learning models 404 from the first vehicle 410 to a cloud server 402, and the second vehicle 412 may upload local machine learning models 408 from the second vehicle 412 to the cloud server 402. As an example, each of the first vehicle 410 and the second vehicle 412 may upload coefficients from a trained neural network. Each of the first vehicle 410 and the second vehicle 412 may upload more than one local machine learning model to cloud server 402. For example, each of the first vehicle 410 and the second vehicle 412 may upload a plurality of local machine learning models corresponding to a plurality of vehicle systems (e.g., such as a steering system, a braking system, and the like). Cloud server 402 may analyze the uploaded machine learning models from the vehicles, and may construct updated machine learning models to be shared via collaborative learning module 406. For example, based on coefficients from each of the local machine learning models, cloud server 402 may determine an updated global machine learning model for each vehicle system, which may incorporate learning from each of the local machine learning models. In this way, data from each of the first vehicle 410 and the second vehicle 412 may be incorporated into the global machine learning models. For example, the updated global machine learning models may be shared with each of the first vehicle 410 and the second vehicle 412, so that the updated global machine learning model replaces the local machine learning model(s). As vehicle operation continues, each of the first vehicle 410 and the second vehicle 412 may continue to train and update their local machine learning models, so that the process continues, providing continuous, collaborative updates to the machine learning models for each vehicle. For example, applying the CML approach to autonomous vehicles may increase an accuracy of a local machine learning model for a vehicle. The system of FIG. 4, including the cloud server 402 and the vehicles 410 and 412 engaged in the CML approach, may be referred to a CIVIL network.

However, when providing vehicle data (e.g., such as coefficients from the local machine learning model), privacy concerns and security concerns may arise. As an example, an unauthorized participant in a CIVIL network (e.g., such as the CIVIL network shown in FIG. 4) may access data relating to a vehicle without permission. As another example, an unauthorized participant in CML network may provide false vehicle data to the cloud server, resulting in a decrease in accuracy of a global machine learning model. For example, by providing inaccurate vehicle data to the cloud server, accuracy of the global machine learning models may be decreased. Further, the global machine learning models trained on inaccurate vehicle data may be transmitted to vehicles in the CML network, decreasing accuracy of autonomous vehicle perception, path planning, and control systems of the vehicles in the CIVIL network. Overall, privacy and security concerns may decrease customer satisfaction, and decrease usage of autonomous vehicle perception, path planning, and control systems.

To demonstrate the security and privacy concerns associated with CIVIL networks, FIG. 5 shows an example CIVIL network 500 including an unauthorized vehicle. For example, FIG. 5 shows a cloud server 402, the first vehicle 410, and the second vehicle 412, the first vehicle 410 and the second vehicle 412 engaged in a CML approach. However, as shown in FIG. 5, an unauthorized vehicle 502 may participate in the network. As an example, the unauthorized vehicle 502 may provide incorrect or biased data to cloud server 402, which may decrease an accuracy of the global machine learning model. As shown in FIG. 5, the unauthorized vehicle 502 provides inaccurate data to cloud server 402, which influences the updated global models distributed to the first vehicle 410 and the second vehicle As another example, the unauthorized vehicle 502 may access data regarding other vehicles in the network (e.g., such as data from the first vehicle 410 and the second vehicle 412), which may decrease privacy in the system. For example, decreased accuracy of the global model and decreased privacy may lead to decreased customer satisfaction. Therefore, methods for increasing security and privacy in a CIVIL network are desired, such as by identifying unauthorized vehicles and removing them from a CML network.

The inventor herein has recognized the above deficiencies, and has advantageously recognized that a group signature scheme may be applied to a CML network for autonomous vehicles in order to identify and remove unauthorized vehicles. A group signature scheme is an advanced form of digital signature that provides enhanced features of privacy and anonymity. As an example, a group may comprise a plurality of vehicles (e.g., group members), a group manager, a collaborator, and a revocation authority. The group manager, the collaborator, and the revocation authority may each be separate controllers housed in a location remote from each of the plurality of vehicles. In some examples, the group manager, the collaborator, and the revocation authority may be included in a single remote server. The group signature scheme allows a group member (e.g., a vehicle in the group of vehicles) to sign a message (e.g., a data transmission to the collaborator, such as coefficients for a local machine learning model) anonymously with a signature on behalf of the group using a private key. For example, signatures may be verified with respect to a single group public key, but may not reveal the identity of the signer of the message. Thus, a valid group signature is publicly verifiable, so that anyone in possession of the group public key may validate the group signature, without compromising privacy of the signer of the message. For example, the collaborator may determine the identity of the group from the given message, but may not determine the identity of the individual who signed the message. Further, it may be computationally challenging to link a digital signature to a group member, which may prevent an unauthorized participant in the network from identifying the group member (e.g., identifying another vehicle in the group). Further, a valid group signature may not be misattributed. In case of a dispute (e.g., such as a suspected unauthorized participant in the network based on a signature), a message may be opened by the group manager to trace identity of the signer. Thus, unauthorized participants may be identified and removed from the group by the revocation authority.

Therefore, the proposed system, in which a CIVIL network includes a group signature scheme, allows data sharing between a plurality of vehicles, while maintaining privacy and security for the plurality of vehicles. The proposed approach may be used to share the models across ADAS, Digital Cockpit, and V2X applications. For example, the proposed system enables anonymous sharing of local machine learning model while ensuring the correctness of the model. The group signature scheme described herein may be a Boneh, Boyen, and Shacham (BBS) group signature scheme. However, an Ateniese, Camenisch, Joye, and Tsudik (ACJT) group signature scheme, a Camenisch and Groth (CG) group signature scheme, and a Boneh Shacham (BS) group signature scheme may be used without departing from the scope of the present disclosure. The BBS group signature scheme may not support dynamic registration of vehicles. However, other group security schemes may support dynamic registration of vehicles.

FIG. 6 shows a chart 600 of components of a group signature scheme used in a CIVIL network, along with notation and symbols used to represent said components. As shown in row 602, the symbol GV may correspond with a group of vehicles, such as group comprising a number of autonomous vehicles. For example, GV refers to the vehicles using the group signature scheme while engaging in the CML approach. For example, each vehicle may be represented by $V_i$ (row 612), each vehicle belonging to GV and including an autonomous vehicle perception, path planning, and control system (e.g., such as autonomous vehicle perception, path planning, and control system 261 of vehicle 102 of FIGS. 1 and 2). For example, a first vehicle of GV may be represented as $V_1$, and a second vehicle of GV may be represented as $V_2$. Further, as shown in row 604, a group manager may be represented by the symbol GM. The GM may set up the group signature scheme by receiving details of the vehicles as an argument, generating and distributing private and public keys, and revealing an identity of a vehicle in the case of a dispute. As an example, the GM may be a component of a cloud server (e.g., such as the autonomous vehicle cloud 256 of FIG. 2) in communication with each vehicle of GV, such as a controller with instructions stored in non-transitory memory for setting up and managing a group signature scheme. For example, the GM may generate a group manager secret key, gmsk (row 610), when setting up the group signature scheme.

In addition to the GM, other entities involved in the group signature scheme include a collaborator, CM (row 606) and a revocation authority, RA (row 624). For example, CM and RA may also be components of the cloud server. In other examples, one or both of the CM and RA may be hosted in a distinct server separate from the server hosting GM. CM may be a controller with instruction stored in non-transitory for aggregating local machine learning models from vehicles into a global machine learning model, and verifying digital signatures on messages from vehicles. Further, RA may be a controller with instructions stored in non-transitory memory for managing and publishing a revocation list of revoked vehicles. Further, GM may generate a group public key, represented by gpk (row 608), and may give each vehicle a distinct vehicle secret key gsk (row 614). For example, the gpk and the gsk may be assigned when setting up the group signature scheme, according to the method of FIG. 8. For example, each participant in the group signature scheme may append a digital signature σ to a message, such as a message containing a local machine learning model for collaborative learning sent to the collaborator CM. Each vehicle may generate a digital signature σ (row 622) based on the gsk. Further, the gpk of the GV may be used to verify this signature σ by the CM.

In particular, each vehicle $V_i$ may include a local model $LM_i$ (row 616) corresponding to a model for controlling a vehicle system. For example, a second vehicle in GV, $V_2$, may include a local model $LM_2$. For example, $LM_2$ may be a model for a single vehicle system, such as a braking system or a steering system. For example, each vehicle may transmit coefficients and parameters from their local machine learning model to the CM via a message M (row 620). Further, the message M may be signed with the digital signature σ, the digital signature σ generated by the vehicle based on the gsk. As such, each vehicle may generate a distinct and private digital signature. The CM may be a controller with instructions stored in non-volatile memory for verifying digital signatures, analyzing the local machine learning models from the vehicles in GV, and constructing an updated global machine learning model. If the signature for a message M is accepted by the CM, the global model (GB, row 618) may be updated based on the message M, and transmitted to each of the plurality of vehicles. The CM may accept vehicles to participate in the CML network if the digital signature a of the message M is verified by the CM using the gpk. A CML network with a group security scheme is shown in FIG. 7, and a method for setting up and executing the group signature scheme will be described in more detail with respect to method 800 of FIG. 8.

In other examples, each vehicle (e.g., such as a first vehicle and a second vehicle) may include multiple local machine learning models, each local machine learning model associated with a vehicle system. Each distinct local machine learning model of a vehicle may be updated via a distinct CML network with a group signature scheme. For example, in order to update a local machine learning model for a braking system of a first vehicle (e.g., a braking system model), the first vehicle may sign a message including coefficients and parameters of the braking system model with a digital signature, the digital signature generated based in part on a group public key for a first group signature scheme. The first vehicle may then transmit the message to a cloud server (e.g., a cloud server hosting a collaborator, a group manager, and a revocation authority), which may compile coefficients from braking system models of a first group of vehicles with similar braking systems to the first vehicle. Further, in order to update a local machine learning model for a steering system of the first vehicle (e.g., a steering system model), the first vehicle may sign a message including coefficients of the steering system model with a digital signature, the digital signature generated in part based on a group public key for a second group signature scheme. The first vehicle may then transmit the message to the cloud server, which may compile coefficients of the steering system models of a second group of vehicles with similar steering systems to the first vehicle. Stated differently, a vehicle may participate in multiple group signature schemes with different participants, so that a distinct group signature scheme increases the privacy of the CML approach to updating each local machine learning model of a plurality of machine learning models of the vehicle.

The group signature scheme provides several benefits for user security. First, the identity of each vehicle may be protected, so that each vehicle participating in the group signature scheme may not identify other vehicles in the group. For example, the collaborator (CM) may not learn the identity of the vehicle who sends the signature to the collaborator. As such, the identity of each vehicle is known to the group manager (GM). Moreover, the CM may not link different messages coming from same vehicle. Further, no member of the group (or the GM or CM) may produce a valid signature on behalf of other participants, as the gsk of a specific participant is secret and known to the vehicle. For example, an unauthorized participant who signs a message using a digital signature generated with another vehicle's gsk may be detected by GM. Further still, each vehicle that signs a message (e.g., a message including a local machine mode) using its private key (e.g., gsk) may not deny this activity in future. For example, because the gsk is known to the vehicle, and is not known to other entities in the network, no entity other than the vehicle may generate a legitimate signature. Further, the group signature scheme may maintain message correctness. For example, messages with a valid signature may be accepted by the collaborator. As an example, an unauthorized participant may attempt to inject incorrect data into the global model. In order to do so, the unauthorized participant may attempt generate a signature. However, without a secret key (e.g., gsk), the signature may be determined to be invalid. Thus, any invalid signature from an unauthorized participant may be detected by the collaborator during the verification phase, and will be discarded. Additionally, the incident may be reported to the GM to take further action, such as revoking the unauthorized participant from the group via the revocation authority (RA).

Next, FIG. 7 shows a CIVIL network 700 with a group security scheme. For example, a group of vehicles (GV) 718 may be engaged in a CIVIL approach for collaborative learning, and may also be engaged in a group security scheme for providing data security. GV 718 includes a plurality of vehicles, including a first vehicle 714 and a second vehicle 716. As shown, the group manager (GM) 704 may set up the group signature scheme, such as by distributing a group public key (gpk) and a vehicle secret key (gsk) to each vehicle in the group, such as the first vehicle 714 and the second vehicle 716. In some examples, the GM 704 may allow non-member vehicles to join the group. Further, in the event of a dispute, the GM 704 may trace a signed message to reveal the identity of a vehicle in GV 718. For example, each vehicle (such as the first vehicle 714 and the second vehicle 716) may share local machine learning models with a collaborator (CM) 702 via a message, which may be signed using the vehicle secret keys. As shown, the first vehicle 714 transmits a local machine learning model 708 via a message, signed with a digital signature, to CM 702, and the second vehicle 716, transmits a local machine learning model 710 via a message, signed with a digital signature, to CM 702. For example, each vehicle may periodically send a message with a local machine learning model to CM 702, so that the global machine learning model may be updated in order to increase accuracy. In particular, as shown in FIG. 7, CM 702 includes a global machine learning model (GB) 722. The CM 702 may verify each digital signature using the group public key (gpk) and aggregate the local models in order to update GB 722. After updating GB 722 based on the plurality of local machine learning models (e.g., local machine learning model 710 and local machine learning model 708), the CM 702 may distribute the updated GB 722 via collaborative learning module 712.

In the event of a dispute, the GM 704 may determine the identity of a vehicle. For example, if the CM 702 determines that a signature on a message is invalid, CM 702 may request that GM 704 reveal the vehicle identity in order to determine whether an unauthorized vehicle is participating in the group signature scheme. Further, the Revocation Authority (RA) 706 may manage and publish the revocation list of the revoked vehicles (e.g., vehicles the GM 704 determines are unauthorized). For example, the GM 704, the CM 702, and the RA 706 may be hosted by a remote server 720.

As elaborated above, each vehicle may include a plurality of local machine learning models for controlling different vehicle systems, and as such, may participate in multiple CML networks with multiple groups engaged in group security schemes. Further, each vehicle may participate in distinct sets of CIVIL networks, based on the local machine learning models each vehicle's autonomous vehicle perception, path planning, and control system comprises.

Figure 8:
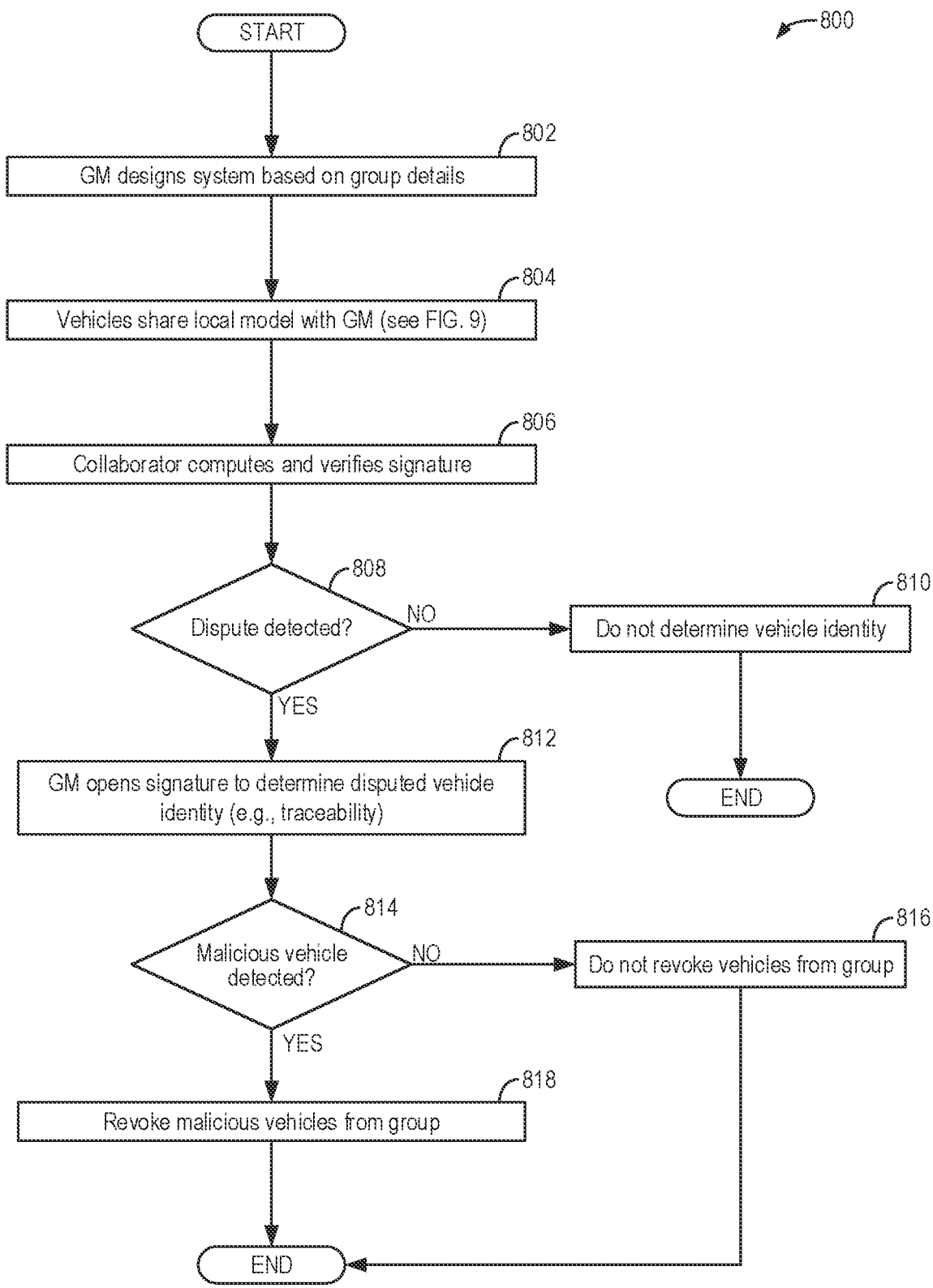
FIG. 8 shows a flowchart of a method for setting up and managing collaborative learning for autonomous vehicles with a group signature scheme.

Next, FIG. 8 shows a method for managing the group signature scheme in order to provide an updated machine learning model to a plurality of vehicles. Method 800 will be described with respect to the CML network with a group signature scheme described with respect to FIG. 7, and including a plurality of vehicles. Each vehicle of the plurality of vehicles may be vehicle 102 described with respect to FIGS. 1 and 2. For example, each vehicle of the plurality of vehicles includes a controller and an autonomous vehicle perception, path planning, and control system, the autonomous vehicle perception, path planning, and control system including at least one local machine learning model for controlling a vehicle system. Further, the CML network includes a remote server hosting several entities, including a collaborator (CM), a group manager (GM), and a revocation authority (RA). For example, each of the CM, the GM, and the RA may be controllers of the remote server. The remote server may be communicatively coupled to each of the plurality of vehicles via a wireless connection, such as one of a Wi-Fi® connection, an Ultra-Wide Broadband (UWB) connection, and the like. Instructions for carrying out method 800 and the rest of the methods included herein may be executed by controllers based on instructions stored on memories of the controllers and in conjunction with signals received from sensors of the vehicle system(s). For example, portions of method 800 may be carried out by a vehicle controller including executable instructions stored in non-transitory memory. Further, portions of method 800 may be carried out by at least one of a CM controller including executable instructions stored in non-transitory memory, a GM controller including executable instructions stored in non-transitory memory, and an RA controller including executable instructions stored in non-transitory memory.

At 802, method 800 includes the GM designing the group signature scheme system based on details of the vehicle group, such as a number of vehicles in the group, the type of machine learning model to be updated via the CIVIL approach, and the vehicle types. In particular, the GM may take details of the vehicles in the group as an argument and may proceed with the following mathematical procedure in order to generate a gpk, a gmsk, and a secret key for each user. In this procedure, $G_1$ and $G_2$ are two (multiplicative) cyclic groups of prime order p, and $g_1$ is a generator of $G_1$ and $g_2$ is a generator of $G_2$. Further, $\psi$ is a computable isomorphism from $G_2$ to $G_1$, with $\psi(g_2)=g_1$. The group signature scheme employs a hash function H: $\{0, 1\}^* \rightarrow Z_p$, which may be treated as a random oracle in the proof of security. The public values are $g_1$, u, v, h$\in G_1$ and $g_2$, w$\in G_2$. Here u, v, and h are random in $G_1$, $g_2$ is a random generator of $G_2$, $g_1$ equals $\psi(g_2)$, and w equals $g_2^\gamma$ for some (secret) $\gamma \in Z_p$. The protocol proves possession of a pair (A, x), wherein A$\in G_1$ and x$\in Z_p$, such that $A^{x+\gamma}=g_1$. Such a pair satisfies $e(A, wg^x_2)=e(g_1, g_2)$. In order to generate the keys, the Gm may first select a generator $g_2$ in $G_2$ uniformly at random. Next, the GM may set $g_1=\psi(g_2)$, and select a random number h=$G_1\setminus\{1_{G1}\}$ and $\zeta_1, \zeta_2 \in_R Z_{*p}$. Next, the GM may set u, v$\in G_1$ such that u $\zeta_1$=v $\zeta_2$=h e. Further, the GM may select $\gamma\in_R Z_{*p}$ and set w=$g_2^\gamma$. Next, using $\gamma$ generate for each user i, 1<=i<=n, a tuple $(A_i, x_i)$ where $x_i\in_R Z_{*p}$ and set $A_i=g_1^{1/\gamma+xi}\in G_1$ g. The group public key is gpk=$(g_1, g_2, h, u, v, w)$, the group private key is gmsk=$(\zeta_1, \zeta_2)$ and the secret key of each user is their tuple gsk[i]=$(A_i, x_i)$. Thus, through this process, the GM is equipped with gpk and gmsk. Further, the GM transmits each vehicle secret key gsk[i] to the respective vehicle in the group GV. Thus, each vehicle receives the gpk for the group, and each vehicle receives a distinct gsk that identifies the vehicle.

At 804, method 800 includes each vehicle in the group of vehicles sharing the local model with the CM. For example, for the group signature scheme, each vehicle ($V_i$) may sign a message (M) containing details of the vehicle's local machine learning model (e.g., such as coefficients of the local machine learning model) before sharing with the collaborator. Thus, each vehicle may follow a mathematical procedure to sign the message with a distinct digital signature $\sigma$. First, a vehicle (e.g., vehicle $V_i$) may select a message M $\in\{0,1\}$. Further, vehicle $V_i$ may compute the following values: $T_1=u^\alpha$, $T_2=v^\beta$, $T_3=Ah^{\alpha+\beta}$, with exponents $\alpha, \in_R Z_p$. The vehicle may select $r_\alpha, r_\beta, r_x, r_{\delta1}, r_{\delta2} \in_R Z_p$, and compute $R_1=u^{r_\alpha}$, $R_2=u^{r_\beta}$, $R_3=e(T_3, g_2)r_x \cdot e(h, w)^{-r_\alpha -r_\beta} \cdot e(h, g_2)^{-r_{\delta1} -r_{\delta2}}$, $R_4=T_1^{r_x} \cdot u^{-r_{\delta1}}$, $R_5=T_2^{r_x} \cdot v^{-r_{\delta2}}$ Next, vehicle $V_i$ may compute a challenge c using the hash function as: $c=H(M, T_1, T_2, T_3, R_1, R_2, R_3, R_4, R_5)\in Z_p$. Further, vehicle $V_i$ may use value c to construct the following values: $s_\alpha=r_\alpha+c\alpha$, $s_\beta=r_\beta+c\beta$, $s_x=r_x+cx$, $s_{\delta1}=r_{\delta1}+c\delta1$, $s_{\delta2}=r_{\delta2}+c\delta2$. Finally, the signature for the message is computed as follows: $\sigma=(T_1, T_2, T_3, c, s_\alpha, s_\beta, s_x, s_{\delta1}, s_{\delta2})$, with helper values $\delta1 \leftarrow x\alpha$ and $\delta2 \leftarrow x\beta \in Z_p$. Thus, each vehicle signs their message M with a distinct digital signature $\sigma$ (e.g., generated with the gsk) and transmits the signed message to the CM. A method for operating an individual vehicle to send a local machine learning model to the collaborator is described in more detail with respect to FIG. 9.

At 806, method 800 includes the collaborator computing and verifying the vehicle signatures. For example, the collaborator may compute the following values in order to verify a digital signature $\sigma$: $R'_1=u^{s_\alpha} \cdot T_1^{-c}$, $R'_2=v^{s_\beta} \cdot T_2^{-c}$, $R'_3=e(T_3, g_2) s_x \cdot e(h, w)^{-s_\alpha -s_\beta} \cdot e(h, g_2)^{-s_{\delta1} -s_{\delta2}} \cdot (e(T_3, w)/e(g_1, g_2))^c$, $=T_1^{s_x} \cdot u^{-s_{\delta1}}$ $R'_5=T_2^{s_x} v^{-s_{\delta2}}$. Further, the collaborator may compute a challenge c'=$H(M, T_1, T_2, T_3, R'_1, R'_2, R'_3, R'_4, R'_5)$, and may accept the signature if and only if c is equal to c'. Thus, the collaborator verifies each digital signature $\sigma$ with the group public key (gpk) before accepting the message M.

At 808, method 800 includes determining whether a dispute is detected. For example, a dispute may be detected if the collaborator determines that a vehicle signature is not valid, such as if c is not equal to c'. As another example, a dispute may be detected if a first vehicle attempts to identify another participant based on a transmitted message.

If method 800 determines that a dispute is not detected at 808, method 800 continues to 810 and includes not determining the vehicle identity. For example, the collaborator may not request that the group manager determine an identity of a vehicle with an invalid signature, and all vehicles may remain in the group. Further, because the message M is accepted, the collaborator may incorporate the contents of M into an updated global machine learning model, which may in turn be distributed to each vehicle in GV. For example, the updated machine learning model may incorporate details from each vehicle in GV, so that the updated machine learning model is more accurate relative to each vehicle's local machine learning model. Thus, accuracy of each vehicle's autonomous vehicle perception, path planning, and control system may be increased. Method 800 may then end.

If method 800 determines that a dispute is detected at 808, method 800 continues to 812 and includes the GM opening a signature of a disputed vehicle to determine a disputed vehicle identity. For example, if the collaborator determines that c is not equal to c' for a signature from a vehicle, the collaborator may request that the GM open the signature and determine the vehicle identity. This step may provide traceability, so that an unauthorized vehicle may be traced and identified. In order to open the signature to reveal the identity of the corresponding vehicle, the GM may take as an input the following: gpk=$(g_1, g_2, h, u, v, w)$, group manager's private key gmsk=$(\zeta_1, \zeta_2)$, message M, and signature $\sigma=(T_1, T_2, T_3, c, s_\alpha, s_\beta, s_x, s_{\delta1}, s_{\delta2})$. Further, the GM may verify that $\sigma$ is valid on message M using the steps given at 806. If the signature σ is valid, then vehicle's identity may be traced by recovering vehicle's element A as $A = T_3/(T^{\xi_1}_1, T^{\xi_2}_2) d$. The GM may go through the user index corresponding to calculated element A of the vehicle's private key. Thus, the GM may determine the identity of a corresponding vehicle.

At 814, method 800 includes determining whether an unauthorized vehicle is detected. For example, based on the identity of the corresponding vehicle, the GM may determine whether the vehicle is unauthorized to be engaged in the CIVIL network. For example, if the identity of the corresponding vehicle does not correspond to an authorized vehicle, the GM may determine that an unauthorized vehicle is detected.

If method 800 determines that an unauthorized vehicle is not detected at 814, method 800 continues to 816 and includes not revoking vehicles from the group. For example, the GM may not report the unauthorized vehicle to the revocation authority (RA), and the RA may not remove the unauthorized vehicle from the group. For example, the GM may determine that the corresponding vehicle may continue to participate in the CML system.

If method 800 determines that an unauthorized vehicle is detected at 814, method 800 continues to 818 and includes revoking the unauthorized vehicle from the group. For example, the GM may inform the revocation authority that a subset of vehicles {1,2,3, . . . r} are unauthorized and may be revoked from the group. First, the Revocation Authority (RA) publishes a Revocation List (RL) which contains the private key gsk of all revoked vehicles. Next, the RL is given to all vehicles and collaborator in the system to get the updated group public key, c. The collaborator and each of the vehicles in the group may compute $y = \Pi_{i=1}^{r} (\gamma + x_i) \in Z^*_p$ to calculate $g'_1 = g_1^{1/y}$, $g'_2 = g_2^{1/y}$, $w' = (g'_2)^\gamma$. As such, the new public key becomes $gpk = (g'_1, g'_2, h, u, v, w') h$. For example, an unrevoked member with old private key as $gsk = (A, x)$ may calculate an updated private key $(A', x)$ wherein $A' = (g'_1)^{1/(\gamma+x)}$. Thus, the unauthorized vehicle may not calculate the new public key, and as such, may not send messages to the collaborator. Further, in some examples, the RA may add a vehicle to the revocation list when the vehicle requests to leave the group security scheme. As an example, due to a change in geographic location, a vehicle may request to leave the group security scheme, and the RA may add the vehicle to the revocation list. Method 800 may then end.

In this way, a group manager may set up group security scheme for a group of vehicles, a collaborator may verify digital signatures and compile local machine learning models to update a global machine learning model, the group manager may resolve disputes, a revocation authority may remove unauthorized vehicles, and the collaborator may distribute the updated global machine learning model via the CIVIL network. Overall, system privacy and security for the CML network is increased.

Next, FIG. 9 includes a flowchart of a method 900 for operating an individual vehicle to participate in a CML network with a group security scheme in order to send a local machine learning model signed with a digital signature, and to receive an updated machine learning model in order to increase an accuracy of autonomous operation. For example, the updated machine learning model may be updated based on data from the vehicle and other collaborating vehicles participating in the CIVIL network. In particular, method 900 is described with respect to the vehicle 102 of FIG. 1 and the in-vehicle computing system 109 of FIG. 2, including the autonomous vehicle perception, path planning, and control system 261. Further, the vehicle may participate in a CIVIL network with a group security scheme, such as described with respect to FIG. 7. Instructions for carrying out method 900 may be stored in non-transitory memory of the in-vehicle computing system (e.g., storage device 208 shown in FIG. 2). As such, method 900 may be executed by a processor (e.g., operating system processor 214 of FIG. 2) based on stored instructions and in conjunction with signals received from the sensors of the vehicle system such as the sensors described hereinabove with reference to FIG. 2.

At 902, method 900 includes receiving a gsk and a gpk from a GM of the group security scheme. For example, as described with respect to 802 of method 800, the GM may set up the group signature scheme based on details of the vehicles in the group, including generating a gpk for the group, and a gsk for the vehicle. The GM may provide the gsk and the gpk to the vehicle so that the vehicle may generate distinct digital signatures for messages.

At 904, method 900 includes training a local machine learning model based on sensor data. For example, the vehicle includes an autonomous vehicle perception, path planning, and control system, which may control at least one vehicle system based on a local machine learning model. Using machine learning techniques known in the art, the machine learning model is updated during vehicle operation based on vehicle sensor data in order to increase accuracy of the machine learning model. For example, data from vehicle sensors may be compared to training data in order to update one or more coefficients of the local machine learning model.

At 906, method 900 includes determining whether a CIVIL network update is requested. For example, based on vehicle settings and CML network settings, the vehicle may periodically provide coefficients and parameters of the local machine learning model to a CM of the group of vehicles. At 906, the method determines whether such a periodic update is requested.

If method 900 determines that a CIVIL network update is not requested at 906, method 900 continues to 908 and includes not sending an updated model signed with a digital signature to a CM. For example, the method may not generate a digital signature and send a message with coefficients and parameters of the local machine learning model to the collaborator. Method 900 may then return to 904 and continue training the local machine learning model based on sensor data, connected autonomous vehicular sub-systems outputs, and the like.

If method 900 determines that CIVIL network update is requested at 906, method 900 continues to 910 and includes generating a digital signature based on the gpk and the gsk. For example, using the mathematical procedure described with respect to 804 of method 800, the in-vehicle computing system calculates a distinct digital signature a based on gsk and gpk. As described with respect to 804 of method 800, the mathematical procedure takes gsk and gpk as inputs, and calculates a distinct digital signature as an output, which may be used to sign a message to the collaborator. For example, the digital signature is verifiable by the collaborator, and may be traceable by the group manager.

At 912, method 900 includes signing a message with the digital signature and transmitting the message to a collaborator via a wireless connection. For example, the in-vehicle computing system may include an external device interface (e.g., external device interface 212 shown in FIG. 2) for wirelessly transmitting a message to an autonomous vehicle cloud (e.g., autonomous vehicle cloud 256 of FIG. 2). For example, the autonomous vehicle cloud is a remote server hosting the collaborator, the group manager, and the revocation authority. For example, the in-vehicle computing system may sign a message including coefficients and parameters of the local machine learning model with the digital signature, and transmit the signed message to the autonomous vehicle cloud via a wireless connection. Thus, the collaborator may receive the message including coefficients and parameters of the local machine learning model. Further, the collaborator may verify the signature, and update the global machine learning model based on messages from a plurality of vehicles in the group of vehicles, in order to increase accuracy of the global machine learning model.

At 914, method 900 includes receiving coefficients and parameters for an updated machine learning model from the collaborator. For example, the collaborator may send an updated machine learning model to the vehicle, the updated machine learning model based on the global machine learning model updated based on shared local machine learning models from vehicles in the group of vehicles. The vehicle may receive the updated machine learning model via a wireless connection with the external device interface.

At 916, method 900 includes adjusting vehicle operation based on the updated machine learning model received from the collaborator. For example, the local machine learning model may be updated based on the updated machine learning model, so that coefficients and parameters of the local machine learning model are updated. As such, the local machine learning model may control the vehicle systems differently during autonomous operation. Therefore, the autonomous vehicle perception, path planning, and control system may be updated via updating the local machine learning model with the CIVIL approach. Updating the local machine learning model may increase accuracy of the autonomous vehicle perception, path planning, and control system, leading to increased customer satisfaction. Method 900 may then end.

In this way, an autonomous vehicle may participate in a CIVIL approach in order to increase accuracy of a local machine learning model of the vehicle. For example, the vehicle may send coefficients and parameters of the local machine learning model to a cloud server, which may compile coefficients from a plurality of local machine learning models from a plurality of vehicles in order to update a global machine learning model. The cloud server may transmit the updated global machine learning model to the vehicle in order to increase accuracy of the local machine learning model. Further, a group signature scheme may be enacted in order to verify each vehicle in a CIVIL network, and to identify unauthorized vehicles. For example, the vehicle may be provided with a gpk and a gsk, and may generate a distinct digital signature to sign a message including coefficients and parameters of the local machine learning model. By enacting the group signature scheme, network security may be enhanced, while vehicle privacy is maintained. For example, under the group signature scheme, each vehicle may be anonymous, unless a dispute is detected, while unauthorized vehicles may be detected. Further, by engaging in the CML approach, an accuracy of a local machine learning model of each vehicle may be increased, which may increase customer satisfaction.

A technical effect of transmitting a message signed by a digital signature, the message including coefficients and parameters of a local machine learning model, and the digital signature based on a group signature scheme, is that an accuracy of the local machine learning model is increased, and system security is increased.

As an example, a method, comprises: generating, in a vehicle, a digital signature based on a first key and a second key, both of the first key and the second key received from a group manager, and transmitting a message signed with the digital signature to a collaborator, the message including coefficients of a local machine learning model of the vehicle. In the preceding example, the method additionally or optionally further comprising: receiving an updated machine learning model from the collaborator and adjusting the local machine learning model based on the updated machine learning model. In one or both of the preceding examples, additionally or optionally, adjusting the local machine learning model based on the updated machine learning model includes adjusting at least one coefficient of the local machine learning model. In any or all of the preceding examples, additionally or optionally, the updated machine learning model is updated by the collaborator based on data from the vehicle and a plurality of collaborating vehicles. In any or all of the preceding examples, additionally or optionally, the first key is a group public key, the group public key distributed to each of a plurality of collaborating vehicles and the collaborator by the group manager. In any or all of the preceding examples, additionally or optionally, the second key is a vehicle secret key, the vehicle secret key distinct to the vehicle and not distributed to the plurality of collaborating vehicles by the group manager. In any or all of the preceding examples, additionally or optionally, the group manager is a computing system communicatively coupled to each of the vehicle, the plurality of collaborating vehicles, and the collaborator. In any or all of the preceding examples, additionally or optionally, the local machine learning model of the vehicle is configured to at least partially control operation of a vehicle system of the vehicle without an input from a user of the vehicle. In any or all of the preceding examples, additionally or optionally, the vehicle system is one of a steering system, a braking system, an acceleration system, a transmission system, an object detection system, a cruise control system, and a climate control system.

As another example, the method comprises: receiving, at a vehicle, a vehicle secret key and a group public key from a group manager; adjusting, at the vehicle, coefficients of a local machine learning model of the vehicle based on sensor data from at least one sensor of the vehicle; generating, at the vehicle, a digital signature based on the vehicle secret key and the group public key; transmitting the coefficients of the local machine learning model to a collaborator via a message from the vehicle signed with the digital signature; receiving, at the vehicle, coefficients of an updated machine learning model from the collaborator; and adjusting a vehicle system of the vehicle based on the updated machine learning model. In the preceding example, additionally or optionally, each of the group manager and the collaborator are processors external to the vehicle, each of the group manager and the collaborator communicatively coupled to the vehicle, and the group manager communicatively coupled to the collaborator. In one or both of the preceding examples, additionally or optionally, the updated machine learning model from the collaborator is based in part on the coefficients of the local machine learning model. In any or all of the preceding examples, additionally or optionally, the local machine learning model is a machine learning algorithm trained to autonomously control the vehicle system of the vehicle. In any or all of the preceding examples, the method additionally or optionally further comprises: receiving, at the vehicle, a second vehicle secret key and a second group public key from the group manager; adjusting, at the vehicle, coefficients of a second local machine learning model of the vehicle based on sensor data from at least one sensor of the vehicle; generating, at the vehicle, a second digital signature based on the second vehicle secret key and the second group public key; transmitting the coefficients of the second local machine learning model to the collaborator via a message from the vehicle signed with the second digital signature; receiving, at the vehicle, coefficients of a second updated machine learning model from the collaborator; and adjusting second vehicle system of the vehicle based on the second updated machine learning model.

As yet another example, a system comprises: a vehicle system of a vehicle; an autonomous vehicle perception, path planning, and control system including a local machine learning model, the local machine learning model corresponding to the vehicle system and configured to at least partially control the vehicle system; and a controller storing executable instructions in non-transitory memory that, when executed, cause the controller to: receive a group public key and a vehicle secret key from a remote server via a wireless connection; update coefficients of the local machine learning model based on data from at least one sensor of the vehicle; generate a digital signature based on the group public key and the vehicle secret key; transmit a message signed with the digital signature to the remote server, the message including the coefficients of the local machine learning model; and receive an updated machine learning model from the remote server. In the preceding example, additionally or optionally, the remote server includes a group manager, a collaborator, and a revocation authority. In one or both of the preceding examples, additionally or optionally, the vehicle system is one of a braking system, an acceleration system, a steering system, a cruise control system, a climate control system, an object detection system, a lighting system, and a transmission system. In any or all of the preceding examples, additionally or optionally, the controller includes further instructions stored in non-transitory memory that, when executed, cause the controller to: adjust the local machine learning model based on the updated machine learning model from the remote server. In any or all of the preceding examples, additionally or optionally, the digital signature is generated based on one of a BBS group signature scheme, an ACJT group signature scheme, a CG group signature scheme, and a BS group signature scheme. In any or all of the preceding examples, additionally or optionally, the autonomous vehicle perception, path planning, and control system at least partially controls vehicle operation with an input from a user.

In another representation, a collaborative machine learning system comprises: a first vehicle, the first vehicle including a first vehicle controller and a first local machine learning model; a second vehicle, the second vehicle including a second vehicle controller and a second local machine learning model; an autonomous vehicle cloud including a group manager controller, a collaborator controller, and a revocation authority controller, each of the group manager controller, the collaborator controller, and the revocation authority controller communicatively coupled to each of the first vehicle controller and the second vehicle controller via a wireless connection, the group manager controller communicatively coupled to each of the collaborator controller and the revocation authority controller, and the group manager controller including instructions stored in non-transitory memory that, when executed, cause the group manager controller to: generate a group manager secret key and a group public key; assign a vehicle secret key to each of first vehicle and a characteristic of the second vehicle; and responsive to detecting a dispute, determining an identity of one of the first vehicle and the second vehicle based on a digital signature. In the preceding example, additionally or optionally, wherein the first vehicle controller includes instructions stored in non-transitory memory that, when executed, cause the first vehicle controller to: receive a vehicle secret key and the group public key from the group manager controller; adjust coefficients of a local machine learning model of the first vehicle based on sensor data from at least one sensor of the first vehicle; generate a digital signature for the first vehicle based on the vehicle secret key and the group public key; transmit the coefficients of the local machine learning model to the collaborator controller via a message signed with the digital signature for the first vehicle; receive coefficients of an updated machine learning model from the collaborator controller; and adjust a vehicle system of the first vehicle based on the updated machine learning model. In one or both of the preceding examples, additionally or optionally, the second vehicle controller includes instructions stored in non-transitory memory that, when executed, cause the second vehicle controller to: receive a vehicle secret key and the group public key from the group manager controller; adjust coefficients of a local machine learning model of the second vehicle based on sensor data from at least one sensor of the second vehicle; generate a digital signature for the second vehicle based on the vehicle secret key and the group public key; transmit the coefficients of the local machine learning model to the collaborator controller via a message signed with the digital signature for the second vehicle; receive coefficients of an updated machine learning model from the collaborator controller; and adjust a vehicle system of the second vehicle based on the updated machine learning model. In any or all of the preceding examples, additionally or optionally, the collaborator controller includes instructions stored in non-transitory memory that, when executed, cause the collaborator controller to: receive a local machine learning model of the first vehicle and a local machine learning model of the second vehicle; update a global machine learning model based on the local machine learning model of the first vehicle and a local machine learning model of the second vehicle; and transmit the global machine learning model to each of the first vehicle and the second vehicle. In any or all of the preceding examples, additionally or optionally, the revocation authority controller includes instructions stored in non-transitory memory that, when executed, cause the revocation authority controller to: responsive to an unauthorized vehicle, add the unauthorized vehicle to a revocation list; determine a new group public key; and distribute the new group public key to each of the first vehicle, the second vehicle, the group manager, and the controller.

In another representation, a method comprises: generating, at a group manager of a remote server, a group manager secret key and a group public key; assigning, at the group manager of the remote server, a first vehicle secret key to the first vehicle and a second vehicle secret key to the second vehicle; transmitting, at the group manager of the remote server, the first vehicle secret key and the group public key to the first vehicle; transmitting, at the group manager of the remote server, the second vehicle secret key and the group public key to the second vehicle; and responsive to detecting a dispute, determining, at the group manager of the remote server, an identity of one of the first vehicle and the second vehicle based on a digital signature and the group manager secret key.

In another representation, a method comprises: receiving, at a collaborator of a remote server, a local machine learning model of the first vehicle and a local machine learning model of the second vehicle; verifying, at the collaborator of the remote server, a digital signature from the first vehicle and a digital signature from the second vehicle; updating, at the collaborator of the remote server, a global machine learning model based on the local machine learning model of the first vehicle and a local machine learning model of the second vehicle; and transmitting, at the collaborator of the remote server, the global machine learning model to each of the first vehicle and the second vehicle.

In another representation, a method comprises: responsive to an unauthorized vehicle, add the unauthorized vehicle to a revocation list; distribute the revocation list to each of a group manager, a collaborator, and each vehicle of a group of vehicles; determine a new group public key; and distribute the new group public key to each of the first vehicle, the second vehicle, the group manager, and the controller. In the preceding example, additionally or optionally, each vehicle in the group of vehicles includes a local machine learning model configured to autonomously control a vehicle system. In one or both of the preceding examples, additionally or optionally, each of the revocation authority, the collaborator, and the group manager are components of remote server, the remote server communicatively coupled to each of the first vehicle and the second vehicle. In any or all of the preceding examples, additionally or optionally, the new group public key is not transmitted to the unauthorized vehicle.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the telematics unit 30 described with reference to FIG. 1. The methods may be performed by executing stored instructions with one or more logic devices (e.g., processors) in combination with one or more additional hardware elements, such as storage devices, memory, hardware network interfaces/antennae, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising:
   generating, in a vehicle, a digital signature based on a first key and a second key, both of the first key and the second key received from a group manager, and transmitting a message signed with the digital signature to a collaborator, the message including a subset of coefficients of a local machine learning model of the vehicle, wherein the subset corresponds to a vehicle system functionality; and
   receiving an updated machine learning model from the collaborator and adjusting the local machine learning model based on the updated machine learning model, wherein:
      adjusting the local machine learning model based on the updated machine learning model includes adjusting at least one coefficient of the local machine learning model;
      the updated machine learning model is updated by the collaborator based on data from the vehicle and a plurality of collaborating vehicles of a collaborative machine learning network, wherein each of the plurality of collaborating vehicles uploads a plurality of local machine learning models corresponding to a plurality of vehicle systems to a cloud server, wherein the cloud server analyzes the uploaded machine learning models from the plurality of vehicles, and constructs updated machine learning models, wherein, based on coefficients from each of the local machine learning models, the cloud server determines an updated global machine learning model for each vehicle system, which incorporates learning from each local machine learning model, so that data from each of the plurality of vehicles is incorporated into the global machine learning models, wherein the updated global machine learning model is shared with each of the plurality of vehicles so that the updated global machine learning model replaces local machine learning models, and wherein operation continues, where each of the vehicles continues to train and update their respective local machine learning models, providing continuous, collaborative updates to the machine learning models for each vehicle; and
      the first key is a group public key, the group public key distributed to each of the plurality of collaborating vehicles and the collaborator by the group manager, and wherein an unauthorized vehicle that participates in the network has limited ability to provide inaccurate data to the cloud server to data regarding other vehicles in the network by the method removing the unauthorized vehicle by a revocation authority in a location remote from each of the plurality of vehicles.

2. The method of claim 1, wherein the second key is a vehicle secret key, the vehicle secret key distinct to the vehicle and distributed to the vehicle by the group manager, and wherein the unauthorized vehicle signs a message using a digital signature generated with another vehicle's global security kit.

3. The method of claim 2, wherein the group manager is a computing system communicatively coupled to each of the vehicle, the plurality of collaborating vehicles, and the collaborator.

4. The method of claim 1, wherein the local machine learning model of the vehicle is configured to at least partially control operation of a vehicle system of the vehicle without an input from a user of the vehicle.

5. The method of claim 4, wherein the vehicle system is one of a steering system, a braking system, an acceleration system, a transmission system, an object detection system, a cruise control system, and a climate control system.

6. A method, comprising:
receiving, at a vehicle, a vehicle secret key and a group public key from a group manager;
adjusting, at the vehicle, coefficients of a local machine learning model of the vehicle based on sensor data and connected autonomous vehicle sub-systems outputs from at least one sensor of the vehicle;
generating, at the vehicle, a digital signature based on the vehicle secret key and the group public key;
transmitting coefficients of the local machine learning model corresponding to a vehicle functionality to a collaborator via a message from the vehicle signed with the digital signature;
receiving, at the vehicle, coefficients of an updated machine learning model from the collaborator; and
adjusting a vehicle system of the vehicle based on the updated machine learning model, wherein the group public key is distributed to each of a plurality of collaborating vehicles of a collaborative machine learning network and the collaborator by the group manager, wherein each of the plurality of collaborating vehicles uploads a plurality of local machine learning models corresponding to a plurality of vehicle systems to a cloud server, and wherein an unauthorized vehicle that participates in the network has limited ability to provide inaccurate data to the cloud server to data regarding other vehicles in the network by the method removing the unauthorized vehicle by a revocation authority in a location remote from each of the plurality of collaborating vehicles.

7. The method of claim 6, wherein each of the group manager and the collaborator are processors external to the vehicle, each of the group manager and the collaborator communicatively coupled to the vehicle, and the group manager communicatively coupled to the collaborator.

8. The method of claim 6, wherein the updated machine learning model from the collaborator is based in part on the coefficients of the local machine learning model.

9. The method of claim 6, wherein the local machine learning model is a machine learning algorithm trained to autonomously control the vehicle system of the vehicle.

10. The method of claim 6, further comprising:
receiving, at the vehicle, a second vehicle secret key and a second group public key from the group manager;
adjusting, at the vehicle, coefficients of a second local machine learning model of the vehicle based on sensor data from at least one sensor of the vehicle;
generating, at the vehicle, a second digital signature based on the second vehicle secret key and the second group public key;
transmitting the coefficients of the second local machine learning model to the collaborator via a message from the vehicle signed with the second digital signature;
receiving, at the vehicle, coefficients of a second updated machine learning model from the collaborator; and
adjusting second vehicle system of the vehicle based on the second updated machine learning model.

11. A system, comprising:
a vehicle system of a vehicle;
an autonomous vehicle perception, path planning, and control system including a local machine learning model, the local machine learning model corresponding to the vehicle system and configured to at least partially control the vehicle system; and
a controller storing executable instructions in non-transitory memory that, when executed, cause the controller to:
receive a group public key and a vehicle secret key from a remote server via a wireless connection;
update coefficients of the local machine learning model based on data from at least one sensor of the vehicle;
generate a digital signature based on the group public key and the vehicle secret key;
transmit a message signed with the digital signature to the remote server, the message including coefficients of the local machine learning model updated based on the data from the at least one sensor during vehicle operation;
receive an updated machine learning model from the remote server, wherein the updated machine learning model is updated by the remote server based on data from the vehicle and a plurality of collaborating vehicles of a collaborative machine learning network, wherein each of the collaborating vehicles uploads a plurality of local machine learning models corresponding to a plurality of vehicle systems to a cloud server; and
adjust the local machine learning model based on the updated machine learning model, wherein adjusting the local machine learning model based on the updated machine learning model includes adjusting at least one coefficient of the local machine learning model, wherein the group public key is distributed to each of the plurality of collaborating vehicles by the remote server, and wherein an unauthorized vehicle that participates in the network has limited ability to provide inaccurate data to the cloud server to data regarding other vehicles in the network by the method removing the unauthorized vehicle by a revocation authority in a location remote from each of the plurality of vehicles.

12. The system of claim 11, wherein the remote server includes a group manager, a collaborator, and a revocation authority.

13. The system of claim 11, wherein the vehicle system is one of a braking system, an acceleration system, a steering system, a cruise control system, a climate control system, an object detection system, a lighting system, and a transmission system.

14. The system of claim 11, wherein the digital signature is generated based on one of a BBS group signature scheme, an ACJT group signature scheme, a CG group signature scheme, BS group signature scheme, and a group signature scheme with dynamic registration.

15. The system of claim 11, wherein the autonomous vehicle perception, path planning, and control system at least partially controls vehicle operation with an input from a user.

* * * * *